United States Patent [19]
Tsuchiya et al.

[11] Patent Number: 5,684,602
[45] Date of Patent: Nov. 4, 1997

[54] FACSIMILE APPARATUS WITH CODING/DECODING INTERRUPT

[75] Inventors: Suguru Tsuchiya, Komoro; Mitsutoshi Tsukamoto, Ueda; Tadanori Ipponyari, Nagano-ken; Takafumi Higuchi, Ueda; Katsuya Okamoto, Nagano-ken; Masahiro Hayashi, Saku, all of Japan

[73] Assignee: Matsushita Graphic Communication Systems, Inc., Japan

[21] Appl. No.: 267,363

[22] Filed: Jun. 29, 1994

[30] Foreign Application Priority Data

| Jun. 30, 1993 | [JP] | Japan | 5-162150 |
| Jul. 9, 1993  | [JP] | Japan | 5-170130 |

[51] Int. Cl.⁶ ............ H04N 1/00; H04N 1/32; H04N 1/36; G06K 9/36
[52] U.S. Cl. .......... 358/404; 358/468; 358/437; 358/444; 358/412; 358/406; 382/232
[58] Field of Search .......... 358/468, 404, 358/437, 462, 486, 400, 261.1, 261.2, 261.3, 444, 412, 434, 406; 382/232; 395/116

[56] References Cited

U.S. PATENT DOCUMENTS

| 4,630,126 | 12/1986 | Kaku et al. | 358/486 |
| 4,706,126 | 11/1987 | Kondo | 358/434 |
| 4,887,164 | 12/1989 | Takahashi | 358/443 |
| 5,063,459 | 11/1991 | Nakatani | 358/404 |
| 5,148,293 | 9/1992 | Miyachi | 358/404 |

Primary Examiner—Kim Vu
Assistant Examiner—Tia M. Harris
Attorney, Agent, or Firm—Rossi & Associates

[57] ABSTRACT

A facsimile apparatus comprises a receiving buffer for receiving video data, a scanner for reading an image, a VRAM for storing a coded data, a single coding/decoding (C/D) IC for MR-coding, MR-to-MMR coding, decoding, and error-checking, and a page printer, and a control circuit, when an event requiring more than two operations of the C/D IC at the same time, the control circuit permits only one operation and force the other operations to wait in some condition. In another condition, the control circuit permits one of the other operation and force the other operations to wait. For example, when the scanner reads an image to produce read data and the C/D IC codes the read data to store the read data in the VRAM and there is a call, the control means connects the line but keeps the coding if the receiving buffer has a space. In the presence of the space the control circuit interrupt the coding and starts the decoding. Another event requiring operation of C/D IC of the MMR coding from MR coded data and operation of MR coding, decoding, or error-checking may be occur. Various events requiring combination of operations of the single C/D IC at the same time and various adaptable controllings are considered.

16 Claims, 16 Drawing Sheets

FACSIMILE APPARATUS WITH CODING/DECODING INTERRUPT

BACKGROUND OF THE INVENTION

1. Field of the Invention

This invention relates to a facsimile apparatus for transmitting and sending an image.

2. Description of the Prior Art

A first prior art facsimile apparatus having a memory having a large capacity for storing image data is known. Such a prior art facsimile apparatus temporarily stores video data read from an original copy by an image sensor after coding and then, transmits the video data. Moreover, such prior art facsimile apparatus temporarily stores video data received and then, read out the stored data to print out the video image. A recording portion thereof comprises a printer buffer (page memory) for temporarily storing coded video data to be printed. Further, a coding circuit for data-compressing and coding of the video data and a decoding circuit for reproducing the video data through decoding of the coded video data are made into an LSI which effects the coding and decoding processes selectively.

Here, in this specification the following terms are defined as follows:

The term "file-in operation" is an operation that an user input a command of transmitting to the facsimile apparatus in the condition that an original copy has been set on an image scanner. The term "file-in processing" is a processing that in response to the file-in operation, the original copy is read, the read video data is coded, and the coded data is stored. Moreover, the term "memory transmission processing" is an operation that the coded video data stored in a video memory of the facsimile apparatus is transmitted to a telephone line from a communication control portion.

Moreover, the term "paper receiving processing" is a processing that coded video data being received by the communication portion is simultaneously decoded and sequentially store the decoded video data in the printer buffer. On the other hand, the term "memory receiving processing" is a processing that coded video data being received is stored in the video memory every page without decoding and then, the stored video data is read and decoded and the decoded video data is stored in the printer buffer. The term "data receiving processing" means both the paper receiving and memory receiving processings. Moreover, the printer control portion prints video images on papers sequentially when a predetermined amount of video data is stored in the printer buffer.

Here, in the facsimile communication, there are two receiving modes. The first mode is that an error is detected by checking received data through CRC method by the communication control portion of the receiving side, which is referred to as ECM mode. The second method is that checking of the number of bits is effected by the communication control portion after coding of the received data one line by one line without the CRC (Cyclic redundancy check), which is referred as non-ECM mode. An operation for effecting checking of the number of bits for one line with decoding the receiving data in the non-ECM mode is referred to as "error check processing".

A second prior art facsimile apparatus is capable of receiving during the file-in processing and capable of acceptance of the file-in processing by a user during a data receiving processing.

A third prior art facsimile apparatus capable of the memory transmitting processing can accept an operation for registering of the transmitting of a copy which has been set on an image scanner thereof during transmission of video data read from a memory. That is, this prior art facsimile apparatus receives the file-in operation during the memory transmitting processing. In other words, another processing system should be provided which reads a copy to produce video data by an image scanner, codes the video data, and stores the coded video data in a memory, which processing system operates in parallel to the processing system for reading out video data from a memory and for transmitting the read data.

In general facsimile apparatus, video data read by a scanner is coded through the MR method and the coded data is stored in a memory in the file-in processing. On the memory transmission processing, if the video data is transmitted to the partner with fitting the type of coding to the partner by MR coding, it is sufficient that the MR coded video data stored in the memory is sequentially read and transmitted. This processing is simple and moreover, at the same time, it is possible to effect the file-in processing in parallel.

However, it is necessary to transmit MMR coded video data in accordance with a type of the partner facsimile. In this case, the MR coded video data is sequentially read out from the memory, sequentially converted into MMR coded video data by coding/decoding, sequentially stored in a transmission buffer, and the MMR coded video data is sequentially transmitted. This processing is referred to as "code conversion transmission".

The above mentioned prior art facsimile apparatus capable of parallel processing uses two coding/decoding ICs wherein the total cost is high.

SUMMARY OF THE INVENTION

The present invention has been developed in order to remove the above-described drawbacks inherent to the conventional facsimile apparatus.

According to the present invention there is provided a facsimile apparatus for sending and receiving an image as data through a communication line comprising: a receiving buffer for sequentially storing received data; a printer buffer for storing the received data from the coding/decoding circuit in pages; a printer for printing out, in pages, the received data stored in the printer buffer after the decoding to reproduce the received image; a reading circuit for reading the image on a copy to be sent to produce read data; a coding/decoding circuit for coding the read data and decoding the received data; a video memory for sequentially storing the read data coded by the coding/decoding circuit; a detection portion for detecting whether or not a predetermined amount of the received data is stored in the receiving buffer; and a control portion, when there is a call from the communication line while the coding/decoding circuit codes the read data, for keeping the coding/decoding circuit decoding the read data if the predetermined amount of the received data is not stored in the receiving buffer and for interrupting the decoding of the read data by the coding/decoding circuit and causing the coding/decoding circuit to decode the received data from the receiving buffer if the predetermined amount of the received data is stored in the receiving buffer.

According to the present invention there is also provided a facsimile apparatus for sending and receiving an image as data through a communication line comprising: a receiving buffer for sequentially storing received data from the communication line; a reading circuit for reading the image on a copy to be sent to produce read data; a coding/decoding circuit for effecting either of a first, second, or third operation, the first operation coding the read data to produce first coded data, the second operation coding the first coded data to produce second coded data, the third operation decoding the received data; a storing circuit for storing the first coded data; a printer buffer for storing the received data decoded by the coding/decoding circuit in pages; a printer for printing out, in pages, the received data stored in the printer buffer; a detection circuit for detecting whether or not there is a space capable of storing a predetermined amount of the received data in the printer buffer; a first control portion response to a command signal for operating the reading circuit, coding/decoding circuit, and the storing circuit to read the image to produce read data, effects the first operation to coding the read data to produce the first coded data, and store the first coded data respectively and then operating the coding/decoding circuit to effect the second operation to send the second coded data to the communication line using the first coded data stored in the storing circuit; a second control portion responsive to a call from the communication line for operating the receiving buffer to store the received data; and a third control portion responsive to the first and second control portions for keeping the second control portion sending the second coded data in the absence of the space and for, in the presence of the space, interrupting the second operation and operating the coding/decoding circuit, the printer buffer, and the printer to effect the third operation using the received data from the receiving buffer and to print out the received data respectively.

According to the present invention there is further provided a facsimile apparatus for sending and receiving an image as data through a communication line comprising: a receiving buffer for sequentially storing received data; a reading circuit for reading a copy to produce a read data; a coding/decoding circuit for coding the read data from receiving buffer and decoding and effecting error-checking of the received data from the receiving buffer; a printer buffer for storing the received data from the coding/decoding circuit in pages; a printer for printing out, in pages, the received data stored in the printer buffer to reproduce the image received; a video memory for sequentially storing the read data coded by the coding/decoding circuit; a detection circuit for detecting whether or not one page of the received data is stored in the receiving buffer; and a-control portion, when there is the call while the coding/decoding circuit codes the read data, for interrupting that the coding/decoding circuit codes the read data and causing the coding/decoding circuit to effect the error-checking of the received data from the receiving buffer.

According to the present invention there is provided a facsimile apparatus for sending and receiving an image as data through a communication line comprising: a receiving buffer for sequentially storing received data; a reading circuit for reading the image on a copy to be sent to produce read data; a coding/decoding circuit for coding the read data and decoding and effecting error-checking of the received data from the receiving buffer; a printer buffer for storing the received data from the coding/decoding circuit in pages; a printer for printing out, in pages, the received data stored in the printer buffer; a video memory for sequentially storing the read data coded by the coding/decoding circuit; a first detection circuit for detecting whether or not an amount of the read data coded by the coding/decoding circuit from a start of coding of the read data exceeds a predetermined amount; a second detection circuit for detecting whether or not an interval of coding the read data from the start of the coding exceeds a predetermined interval; a third detection circuit for detecting a coding demand; a first control portion responsive to the first and the third detection circuits for operating the coding/decoding circuit to code the received data in presence of the coding demand when the amount of the read data exceeds the predetermined amount; and a second control portion responsive to the second and third detection circuits for operating the coding/decoding circuit to code the received data in presence of the coding demand when the interval exceeds the predetermined interval.

According to the present invention there is also provided a facsimile apparatus for sending and receiving an image as data through a communication line comprising: a reading circuit for reading the image on a copy to be sent to produce read data; a coding/decoding circuit for effecting either of a first or second operation, the first operation coding the read data to produce first coded data, the second operation coding the first coded data to produce a second coded data; a first storing circuit for storing the read data coded by the coding/decoding circuit; a second storing circuit for storing the read data from the reading circuit; a detection circuit for detecting an interruption of the second operation; and a control portion for operating the coding/decoding circuit to effect the second operation and for, when the detection circuit detects the interruption of the second operation, operating the coding/decoding circuit to effect the first operation and storing the first coded data from the coding/decoding circuit in the first storing circuit.

According to the present invention there is further provided a facsimile apparatus for sending and receiving an image as data through a communication line comprising: a reading circuit for reading an image on a copy to be sent to produce read data; a coding/decoding circuit for effecting either of a first or second operation, the first operation coding the read data to produce first coded data, the second operation coding the first coded data to produce a second coded data; a storing circuit for storing the first coded data; a printer buffer for storing the read data from the reading circuit; a detection circuit for detecting an interruption of the second operation; a first control portion for effecting the first operation and operating the storing circuit to store the first coded data; and a second control circuit responsive to the first control portion for operating the coding/decoding circuit to effect the second operation using the first coded data from the storing circuit and operating the reading circuit and the printer buffer to read the copy and store the read data respectively and for, when the detection circuit detects the interruption of the second operation, operating the coding/decoding circuit to effect the first operation and storing the first coded data from the coding/decoding circuit in the first storing circuit.

According to the present invention there is provided a facsimile apparatus for sending and receiving an image as data through a communication line comprising: a reading circuit for reading the image on a copy to be sent to produce a read data; a coding circuit for coding the read data; a storing circuit for storing the coded data; a printer buffer for storing input data; a printer for printing out the image received using an output of the printer buffer; a detection circuit for detecting whether or not a first processing speed at which the coding circuit codes the read data is smaller than a second processing speed at which the reading circuit read the copy; and a control circuit for operating the reading circuit, coding circuit, and storing circuit to read the copy, code the read data, and store read data coded by the coding circuit respectively when the first processing speed is not smaller than a second processing speed and for operating the reading circuit, the printer buffer, the coding circuit, and the storing circuit to read the copy, store the read data, code the read data from printer buffer, and store the read data from the coding circuit respectively when the first processing speed is smaller than a second processing speed.

According to the present invention there is also provided a facsimile apparatus for sending and receiving an image as data through a communication line comprising: an interface circuit responsive to a call for communicating with the communication line; a receiving buffer for sequentially storing received data from the communication line; a coding/decoding circuit for decoding and effecting error-checking of the received data from the receiving buffer; a printer for printing out, in pages, the received data; a video memory for sequentially storing the received data; a detection circuit responsive to the interface circuit for detecting an end signal indicative of an end of page of the received data; and a control circuit for effecting first and second functions, the first function for operating the video memory, the coding/decoding circuit, and the printer to print out the received data stored in the video memory after decoding the received data by the coding/decoding circuit, the received data being received in response to the previous call; the second function responsive to the first function for immediately connecting the interface circuit with the communication line and operating the receiving buffer in response to present the call and for when the detection circuit detects the end signal, interrupting the printer and operating the coding/decoding circuit to effect error-checking of the received data received in response to a present call with repeatedly sent the end signals neglected and sending a response signal to the communication line and restarting the printer in response to a result of the error-checking.

According to the present invention there is also provided a facsimile apparatus for sending and receiving an image as data through a communication line comprising: an interface circuit responsive to a call for communicating with the communication line; a receiving buffer for sequentially storing received data from the communication line; a coding/decoding circuit for decoding and effecting error-checking of the received data from the receiving buffer; a printer for printing out the received data in pages, the printer stopping the printing out of the received data at an end of page in response to a stop command; a video memory for sequentially storing the received data; and a first control portion for effecting first function, second, and third functions, the first function for operating the video memory, the coding/decoding circuit, and the printer to print out the received data stored in the video memory after decoding the received data by the coding/decoding circuit, the received data being received in response to a previous call; the second function responsive to the first function for immediately connecting the interface circuit with the communication line, sending the stop command to the printer, and effecting training with a calling party in response to present the call; the third function responsive to the second function for detecting completion of the training and operating the receiving buffer and the coding/decoding circuit to receive currently incoming data and effect the error-checking of the receive currently incoming data.

According to the present invention there is also provided a facsimile apparatus comprising a receiving buffer for receiving video data, a scanner for reading an image, a video memory for storing a coded data, a single coding/decoding circuit for effecting operations of first-coding, first-coded-data-to-second-coded data coding, decoding, and error-checking, and a page printer for printing with decoded data, and a control circuit for controlling the scanner, video memory, coding/decoding circuit, and page printer, wherein when an event requiring more than the two operations of the coding/decoding circuit at the same time, the control circuit permits only one operation and forces the other operations to wait in a first condition and the control circuit permits one of the other operations and forces the other operations to wait in a second condition.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention.

GENERAL STRUCTURE

Figure 1:
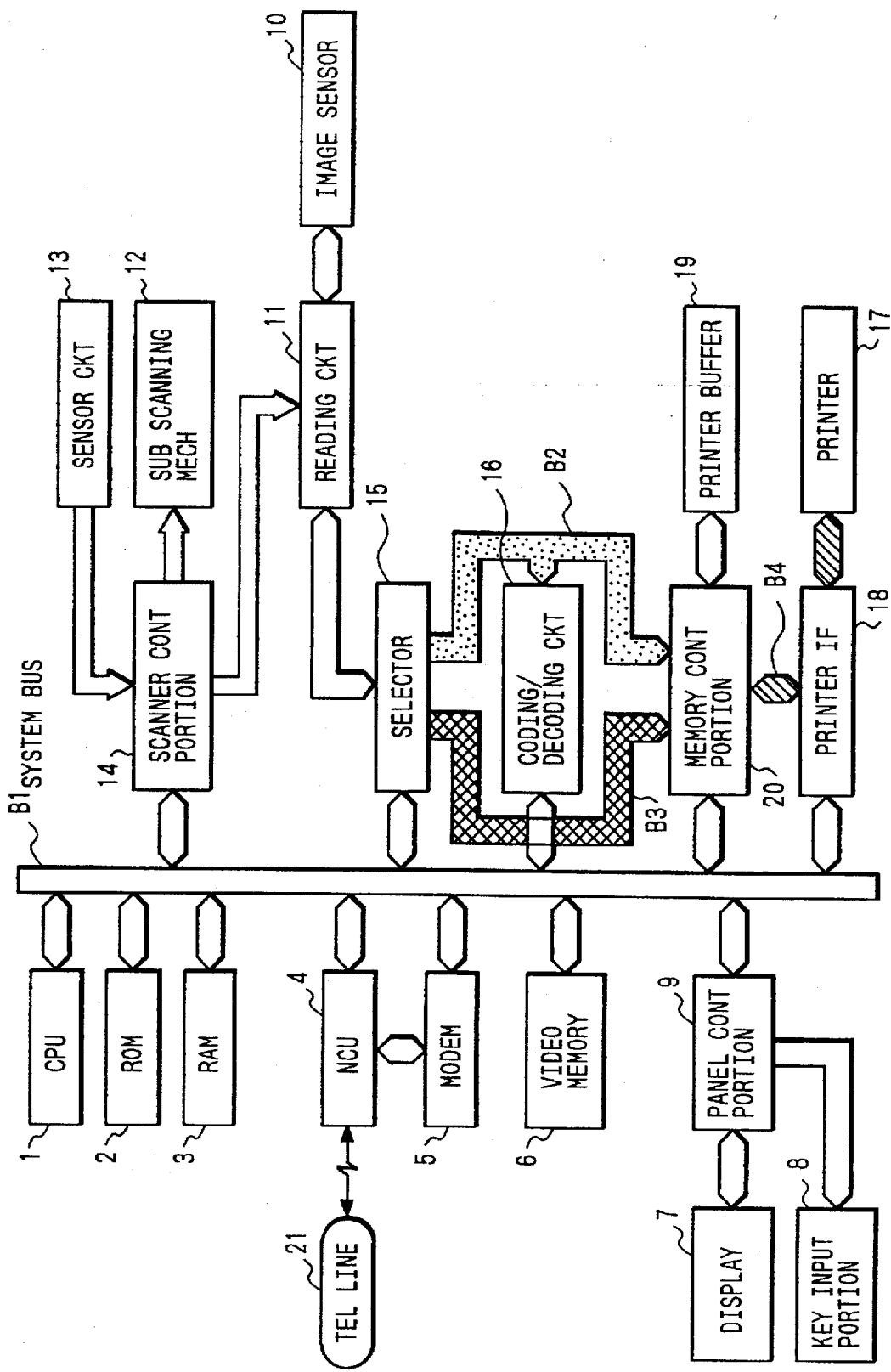
FIG. 1 is a block diagram of the first embodiment of this invention for showing a general structure of a facsimile apparatus.

FIG. 1 is a block diagram of the first embodiment for showing a general structure of a facsimile apparatus. A CPU (central processing unit) 1 acts as a system control portion for executing a sequence control and signal processings of the facsimile apparatus in cooperation with a ROM 2 for storing programs for controlling of the system and with a RAM 3 for storing various information for the controlling of the system. A network control unit (NCU) 4 is connected to a communication line (telephone line) 21 and effects communication controlling in accordance with a telephone line connection control and a facsimile communication protocol. A modem 5 sequentially modulates and transmits a coded video data sent from a video memory 6 through a system bus B1 and and sequentially demodulates received coded video data and sends the demodulated data into the system bus B1 under control of the CPU 1. The video memory (RAM) 6 comprises a DRAM having a relatively large capacity for storing a plurality of pages of coded video data. The CPU 1 accesses the video memory 6 through the system bus B1. On the receiving of data, the modem 5 sends an interruption demand to the CPU 1 every one byte of coded data transmitted from the partner facsimile. In response to the interruption demand, the CPU 1 executes an interruption processing for storing one byte of the received data into a receiving buffer area included in the video memory 6. A display portion 7 and a key input portion 8 forming an operation and display panel are connected to a panel control portion 9 which controls displaying and input processings. The panel control portion 9 is connected to the CPU 1 through the system bus b1, is supplied with display commands and display information from the CPU 1, and sends key input information to the CPU 1 after processing of the key input.

An image scanner comprises a CCD one-dimensional image sensor 10, a reading circuit 11 for sending drive signals to the image sensor 10 and processes an output signal of the image sensor 10, a subscanning mechanism 12 for feeding a copy corresponding to the main scanning by the image sensor 10, a sensor circuit 13 for detecting the presence or absence of a copy, a position of the copy, and positions of movable parts of the sub-scanning mechanism, a scanner control portion 14 for reading the copy with coaction among these elements. The scanner control portion 14 is connected to the CPU 1 through the system bus B1 for controlling the reading of a copy in response to a command information from the CPU 1.

A selector 15 is switched in response to the CPU 1 for selecting of destinations of video data sequentially outputted from the reading circuit 11 on the reading processing of a copy as mentioned later.

The coding/decoding circuit 16 comprises an LSI employing the microprogram controlling method for selectively effecting coding, decoding code conversion, receiving data checking modes in accordance with the command information from the CPU 1 as mentioned later. Here, it is to be noted that only one code/decode circuit 16 which is expensive is used in this facsimile apparatus. This LSI can be obtained generally. That is, an LSI DICEP-A(HD 63183P) manufactured by HITACHI can be used.

A page printer 17 as a recording portion outputs video data as a hard copy. The page printer 17 includes a control system for the printing controlling. A printer interface 18 is provided for operating the control system of the page printer 17 in accordance with the command information from the CPU 1. The page printer 17 is connected to the system bus B1 through the interface 18. A printer buffer (page memory) 19 is provided for storing video data to be printed by the printer 17 in pages. The printer buffer 19 has a capacity of several pages of standard copies of video data. A memory control portion 20 is provided for controlling access to the printer buffer 19. An operation mode is set to the memory control portion 20 in accordance with the command information supplied form the CPU 1 through the system bus B1 and the memory control portion operates as follows:

When the CPU 1 supplies a print command to the printer interface 18 and the memory control portion 20 after storing decoded video data in the printer buffer 19, the printer interface 18 checks the condition of the printer 17. If the printer 17 is operable, the CPU 1 causes the memory control portion 20 to read video data in the printer buffer 19 and supply the video data to a bus B4 and supply the read video data to the printer 17 through the printer interface 18. This operation provides printing of video data on a paper as an image. If the printer 17 is busy, the CPU 1 waits until the printer 17 becomes operable. In this operation, the data transmission control is effected under the control of the control system of the printer 17 and an access system of the printer buffer 19 is separated from the system bus B1.

SCANNING OPERATION

There are two modes of processing of video data read from an original copy by the image scanner.

The first is an uncoding read out mode in which original video data sequentially outputted from the reading circuit 11 is supplied to the memory control portion 20 through the selector 15 and the bus B3 and sequentially stored in the printer buffer 19 by the memory control portion 20.

The second is a coding mode in which the original video data sequentially outputted from the reading circuit 11 is supplied to the coding/decoding circuit 16 through the selector 15 and the bus B2 and the coding/decoding circuit 16 reads the original data on the bus B2 in phase with the reading operation to effect the MR-coding and sequentially outputs the coded video data to the system bus B1. The CPU 1 stores the coded video data sequentially outputted from the coding/decoding circuit 16 in the video memory 6.

It is determined by the command of the CPU 1 whether the reading operation is effected in the uncoding read out mode or the coding mode as mentioned later.

OPERATION RELATING TO THE CODING/DECODING CIRCUIT 16

There is one coding/decoding circuit 16 in this facsimile apparatus. The CPU 1 performs various modes through coacting the coding/decoding circuit 16 and other portions as follows:

(A) READING AND CODING PROCESSING MODE

This is an operation mode on the file-in processing mentioned above. The CPU 1 operates the scanner control portion 14 to read out the original copy set on the scanner and the reading circuit 11 to sequentially supply the original video data to the coding/decoding circuit 16 via the bus B2 to effect the MR-coding to supply the coded data to the system bus B1 through coacting of the scanner control portion 14 and the coding/decoding circuit 16. The CPU 1 sequentially stores the coded video data into the video memory 6 in phase with the coding operation.

(B) PAPER RECEIVING AND CODING PROCESSING MODE

In the video data receiving condition from another facsimile apparatus, it is an operation that the coded video data under being stored in the receiving buffer area of the video memory 6 is decoded in a substantially real time manner in parallel to the receiving operation and the decoded video data is sequentially stored in the printer buffer 19. In this case, the data to be processed in the video memory is supplied to the coding/decoding circuit 16 through the system bus B1 under the control of the CPU 1 and the decoded data is supplied to the memory control portion 20 through the bus B2 and is stored in the printer buffer 19 by the memory control portion 20.

(C) MEMORY RECEIVING AND DECODING MODE

This mode is basically effected when there is no space in the printer buffer 19 on receiving. In this case, the CPU 1 waits until one page of video data has been stored in the receiving buffer area of the video memory 6 and when the one page of data has been stored, the CPU 1 adds a mark data indicative of reception by the memory receiving to received data on the storing the received data in the video memory 6. Then, when there is a space in the printer buffer 19, the data received by the memory receiving is sequentially read out from the video memory 6 and supplied to the coding/decoding circuit 16 through the system bus B1 and then, the coding/decoding circuit 16 decodes the read data and the decoded data is sequentially stored in the printer buffer 19 through the bus B2 and the memory control portion 20. Here, the operation of storing the decoded data which was received by the memory receiving is referred to as "memory receiving data decoding".

(D) NON ECM LUMP ERROR CHECK MODE

It is an operation when the receiving mode is in the non ECM (Error Correction Mode) mode and the memory receiving processing is effected. On the memory receiving, when one page of recent received data has been stored in the receiving buffer area of the video memory 6, one page of the data is continuously supplied to the coding/decoding circuit 16 via the system bus B1 under the control of the CPU 1. The coding/decoding circuit 16 sequentially decodes the received data and counts up the number of bits of the decoded data every line and judges whether the counted number agrees with a predetermined number. When there is no agreement, an error occurs. In this mode, the decoded data is not used. However, the result of the judgment every one line is sent to the modem 5 through the system bus B1. The modem 5 totally judges the one page of results and provides a synthetic result of one page of data and proceeds with a handshaking sequence appropriately with the communication partner in accordance with the synthetic result.

Here, in the case of the paper receiving operation in the non ECM mode, the error checking is effected every one ling during the page receiving and decoding of the paper receiving mode (B) and the result is supplied to the modem 5.

(E) CODE CONVERSION MODE ON TRANSMITTING

It is a processing that the video data is converted into the MMR (Modified Modified Read) coded data in accordance with a type of a communication partner for transmitting when the MR (Modified Read) coded video data stored in the video memory 6 by the file-in processing. That is, under the control of the CPU 1, the MR coded video data is read out every predetermined amount of data from the video memory 6 and is supplied to the coding/decoding circuit 16 via the system bus B1. The coding/decoding circuit 16 effects the MMR coding after once the MR coded data is decoded. The MMR coded data is temporarily stored in the data transmission buffer in the video memory 6 via the system bus B1 and transmitted sequentially.

(F) CODING MODE

It is a mode for coding the original data once stored in the printer buffer 19 by the original data uncoding read out operation. In this case, the memory control portion 20 reads out the object data to be processed and supplies read data to the bus B2 and the coding/decoding circuit 16 sequentially effects the MR coding of the data on the bus B2 in phase with the reading operation and the coded data is sequentially stored in the video memory 6 via the system bus B1 under the control of the CPU 1.

TRANSMISSION OPERATION

When the CPU 1 sends the transmission command to the NCU 4 and the modem 5, the NCU 4 and the modem 5 connect the telephone line with the communication partner through the predetermined procedure and recognize and inform the specification or type of the facsimile apparatus of the communication partner to the CPU 1. Then, in the phase of transmission of the video data, the modem 5 sends a transmission data demand signal. In response to the transmission data demand signal, the CPU 1 executes an interruption processing (refer to FIG. 5), and reads one byte of coded video data of the object data in the video memory 6 (hereinafter referred to as "transmission data") and the read video data is supplied to the modem 5. That is, with the transmission of data, the CPU 1 is interrupted to effect the transmission data demand interruption to send one byte of the transmission data to the modem 5. Here, if the MR coded data in the video memory 6 is transmitted to the communication partner as it is while the MMR coded data should be transmitted in accordance with the type of the communication partner, the code conversion processing mentioned above is performed in parallel to the transmission processing.

PRINTING OPERATION

When the original video data is stored in the printer buffer 19 and the CPU 1 provides a print command to the printer interface 18 and the memory control portion 20, the memory control portion 20 reads and supplies the video data in the printer buffer 19 to the bus B4. The video data on the bus B4 is supplied to the printer 17 via the printer interface 18. This provides the printing of the video data on a recording paper. In this case, the data transmission control is performed by the control system of the printer 17 and the printer buffer 19 is separated from the system bus B1.

BASIC CONTROL OPERATION BY CPU 1

Figure 2:
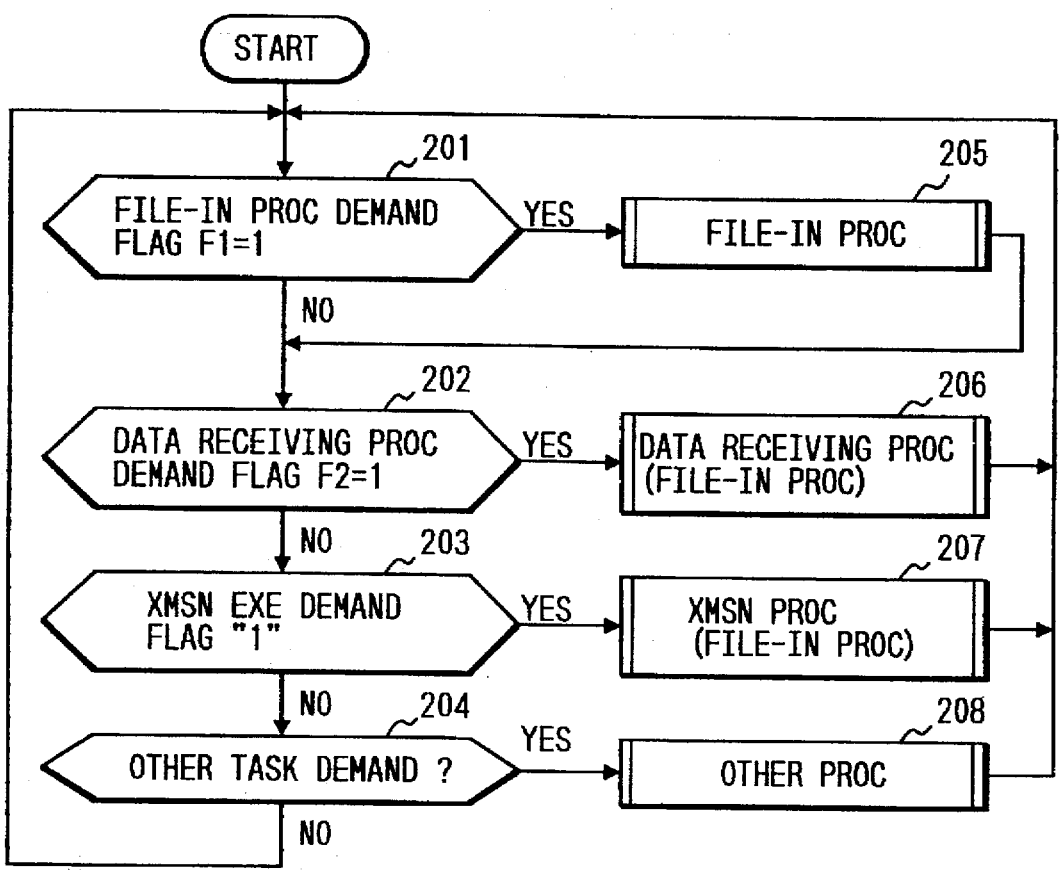
FIG. 2 shows a flow chart of the embodiment of this invention for showing a basic control operation.

FIG. 2 shows a flow chart of the embodiment of this invention for showing a basic control operation of the CPU 1. In the idle state of the facsimile apparatus, the CPU 1 repeats the processing through steps 201→202→203→204→201 and waits for an occurrence of some processing demand. When the user performs the file-in operation using the key input portion 8 after setting of an original copy on the scanner, an interruption is applied to the CPU 1 from the panel control portion 9, and then a file-in demand flag F1 is set. Then, the processing proceeds from step 201 to step 205 to start the file-in processing.

In step 202, the cpu 1 checks whether or not a data receiving processing demand flag F2 is set. If the data receiving demand flag F2 is set, processing proceeds to step 206. That is, the communication control portion including the modem 5 starts the receiving operation. When the receiving operation enters a receiving data processing phase, an interruption from the modem 5 causes the CPU 1 to set a data receiving processing demand flag F2 to 1. Then, processing proceeds from step 202 to 206, so that the data receiving processing is started. The data receiving processing 206 is operable in parallel to the file-in processing as mentioned later.

Further, if a transmission execution flag is set in step 203, processing proceeds from step 203 to 207, so that transmission processing is started. The transmission processing 203 is operable in parallel to the file-in processing. Other tasks are denoted as step 208.

FLOW OF FILE-IN PROCESSING

Figure 3:
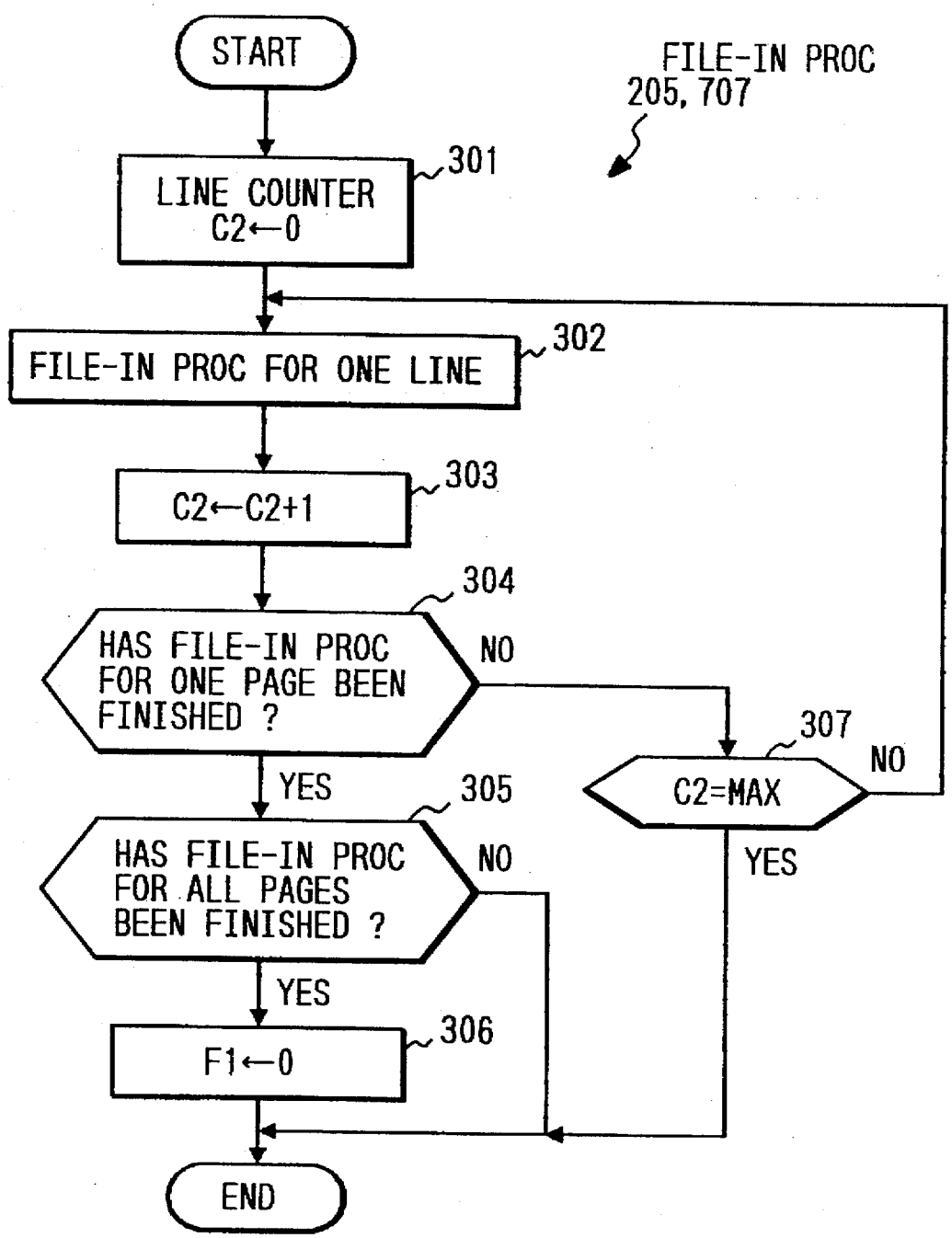
FIG. 3 shows a flow chart of this embodiment for showing the file-in processing of step 205 shown in FIG. 2.

FIG. 3 shows a flow chart of this embodiment of the invention for showing the file-in processing of step 205 shown in FIG. 2. At first, in step 301, a line counter C2 for counting the number of lines where the reading has been finished is cleared. In the following step 302, an original copy is read out by one line and the read video data is coded and stored in the video memory 6. In step 303, the line counter C2 is increased by one. In the following step 304, a decision is made as to whether reading and coding of one page of original copy by repeated execution of the step 302 has been finished. If the answer is NO, processing proceeds to step 307 where a decision is made as to whether or not a value of the line counter C2 reaches the predetermined value MAX. If it does not reach the predetermined value MAX, processing returns to the one line of file-in processing of step 302.

Here, the predetermined value MAX is the maximum line number that the coding processing can be executed without an interruption if the length of the original copy read is longer than the ordinary size. That is, it takes a longer time than that would be the ordinary case to effect the file-in processing shown in FIG. 3 if the length of the original copy read is extremely longer than the ordinary size. After one page of original copy has been coded, the CPU 1 checks whether or not the received data processing demand (step 202) or the transmission execution demand (step 203) flags are set, so that if the processing time for the one page of coding processing is long, the start of other processing is delayed. The predetermined value MAX is determined by the amount of processing or processing time after the file-in processing and is provided in order to prevent of delay in the start of other processings.

If the reading and coding of data of one page of the original copy has been finished by executing of the step 302, the CPU 1 makes a judgement whether there is an original copy to be read out. If there is no page to be read, a file-in demand flag F1 is reset to end this processing (steps 304→305→306). If there is the next page, this processing is finished without resetting of the flag F1. Moreover, if the value of the line counter C2 reaches MAX1 halfway the page, this processing is finished without resetting of the flag F1.

As mentioned above, once processing enter the file-in processing 205, one page of the original copy is read and the processing exits the file-in processing 205, and as shown in FIG. 2, the CPU checks the conditions of the demand flags of other processings. Then, if the data receiving processing demand flag F2 is set, processing proceeds to step 206, where the data receiving processing is executed in parallel to the file-in processing.

FLOW OF DATA RECEIVING PROCESSING

Figure 4:
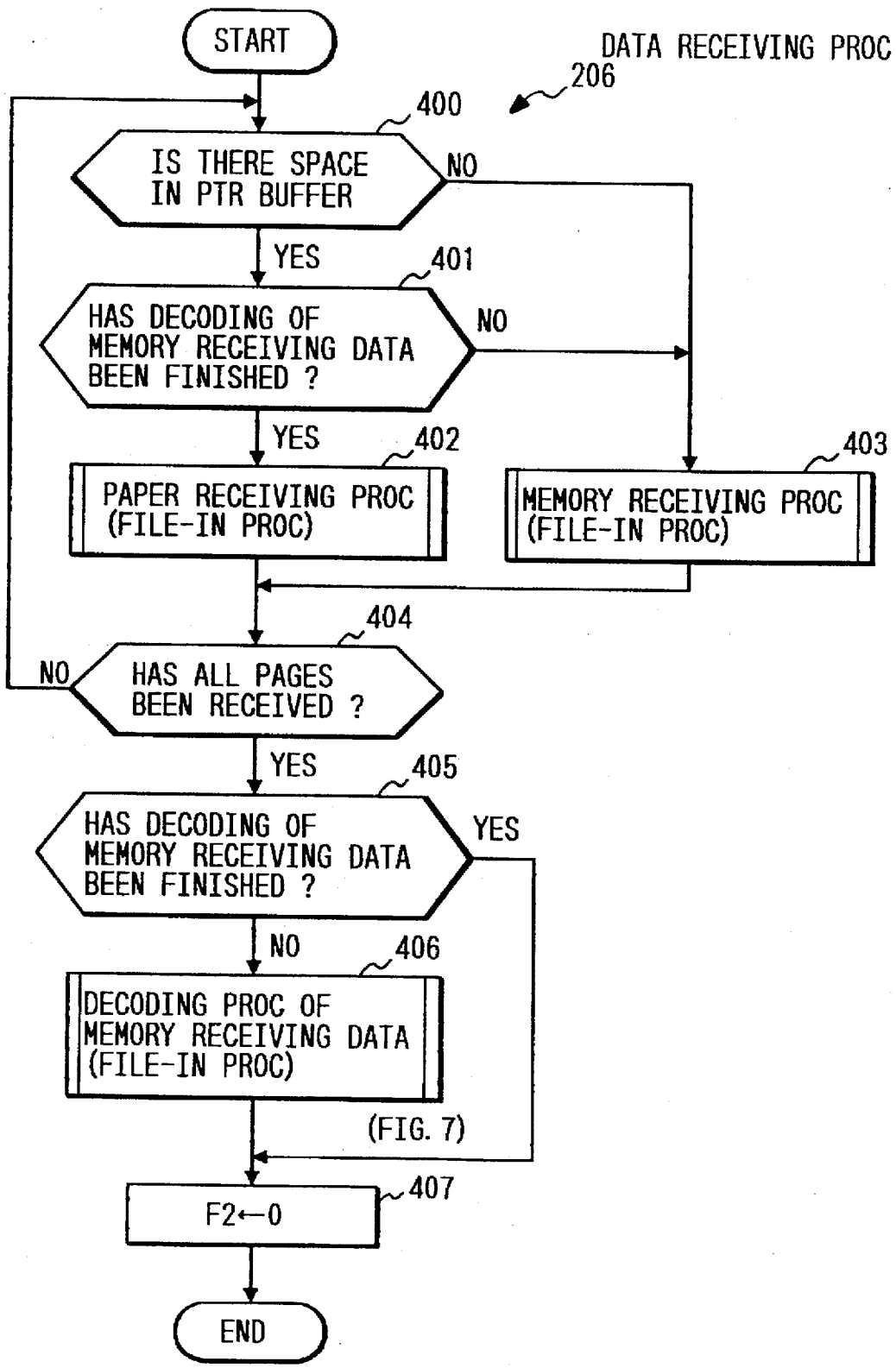
FIG. 4 shows a flow chart of this embodiment for showing the data receiving processing of the step 206 shown in FIG. 2.

FIG. 4 shows a flow chart of this embodiment of this invention for showing the data receiving processing of the step 206 shown in FIG. 2. This processing includes the paper receiving processing of step 402, memory receiving processing of step 403, and the memory receiving data decoding processing of step 406 which are executed in parallel to the file-in processing as follows:

When the data receiving processing is started, at first, the CPU 1 checks whether there is a space more than a predetermined amount of data in the printer buffer 19 in step 400. If there is the space, the CPU 1 checks whether the decoding of the memory receiving data which has been processed previously has been finished in step 401. If it is not the space in the printer buffer 19 and if there is necessary to decode the memory received data, processing proceeds to step 402 where the paper receiving and coding processing is effected for one of data. If there is no space in the printer buffer 19 or the decoding of the memory receiving data has not been finished though there is the space in the printer buffer 19, processing proceeds to step 403 where the memory receiving and decoding processing is effected.

If one page of received data has been processed in step 402 or 403, processing proceeds to step 404 where a decision is made as to whether all pages of data have been received or data of the following page should be received. If there is the following page, processing returns to step 400. If there is no following page, processing proceeds to step 405.

In step 405, the CPU 1 makes a decision as to whether or not the processing of storing the decoding the data received by the memory receiving processing in the step 403 in the printer buffer 19 has been finished. If the processing has not been finished, the remaining processing is done to finish this processing in step 406. Then, the CPU 1 resets the receiving data processing demand flag F2 and ends this processing in step 407.

FLOW OF PAPER RECORDING PROCESSING

Figure 5:
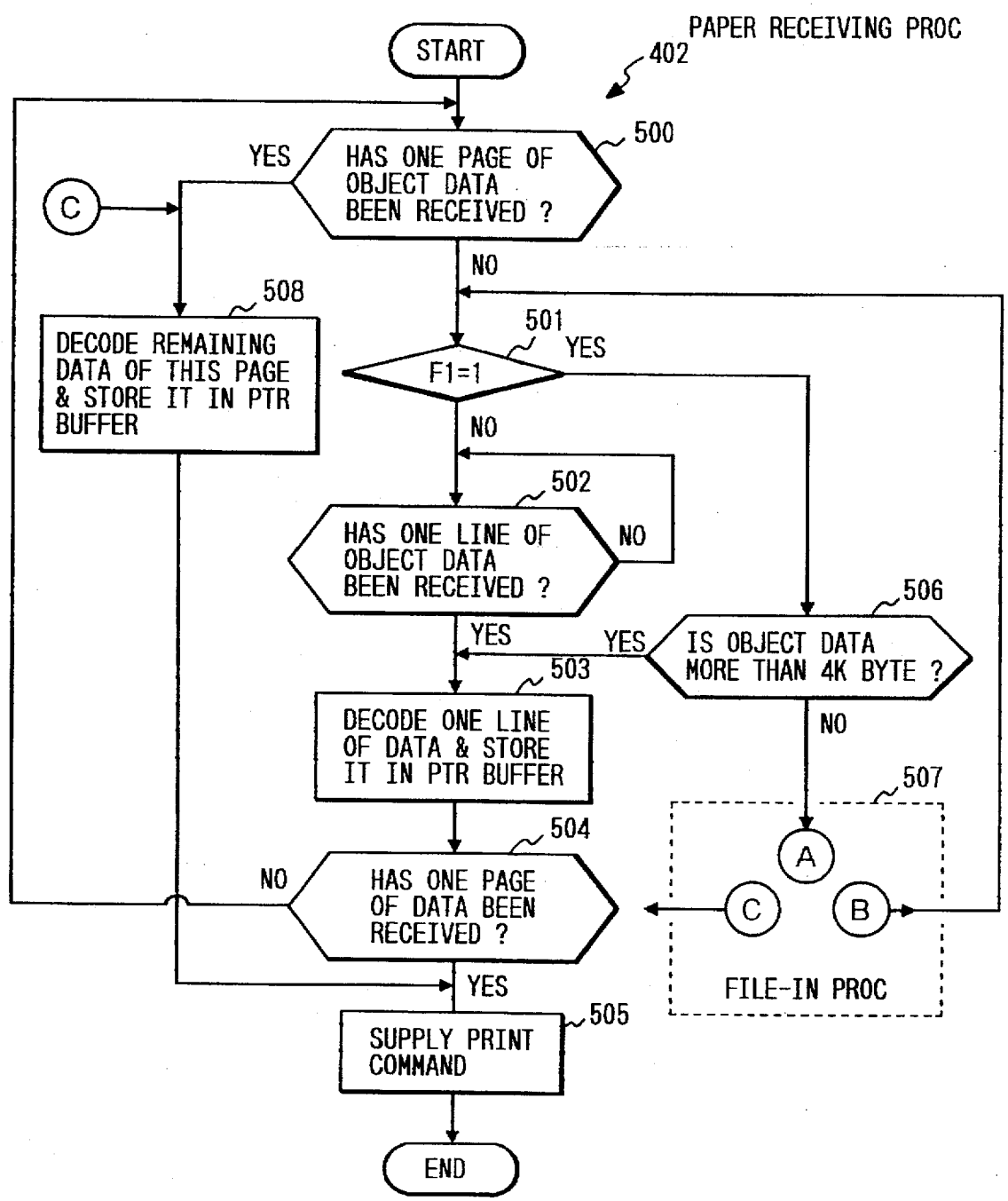
FIG. 5 shows a flow chart of this embodiment for showing the paper receiving processing of step 402 shown in FIG. 4.

FIG. 5 shows a flow chart of this embodiment of this invention for showing the paper receiving processing of step 402 shown in FIG. 4. When processing enters this processing routine, the CPU 1 checks whether or not one page of object data (to be processed) has been received in step 500. At first, the receiving has not completed, so that in the following step 501, the CPU 1 checks the condition of the file-in processing demand flag F1.

In the case that the file-in processing demand flag F1 is reset.

In this case, the CPU 1 executes only the paper receiving and decoding processing. That is, the CPU 1 waits until one line of the object data is stored in the receiving buffer area of the video memory 6. Then, when this event occurs, the CPU 1 executes the decoding of the one line of data and the decoded data is stored in the printer buffer 19 in steps 502 and 508. The processing in step 508 causes the repeated execution of steps 508→504→500→501→502→508 until one page of data has been finished.

When one page of received data is decoded entirely, the CPU 1 supplies the print command to the printer interface 18 and to the memory control portion 20 in step 505. This ends the one page of paper receiving and decoding processing in step 505, so that processing exits this paper receiving processing.

In the step 500, if the CPU 1 detects an end of this page under receiving before the CPU 1 detects end of the processing of one page of data in step 504, processing proceeds to step 508 where the remaining data of that page is decoded and the CPU 1 supplies the print command in step 505 and processing exits this paper receiving processing. Therefore, though the file-in demand flag F1 is set during this processing, the CPU 1 does not respond to this.

In the case that the file-in processing demand flag F1 is set.

In this case, during the processing of the paper receiving and decoding processing, a file-in processing 507 is executed. At first, the CPU 1 detects F1="1" in step 501 and in the following step 506, the CPU 1 checks whether object data of the paper receiving and decoding processing is stored in the receiving buffer area of the video memory 6 is more than 4K bytes. If the data is stored more than 4K bytes, processing proceeds to step 503 where the paper receiving and decoding processing is executed. If the data is less than 4k bytes, processing proceeds to the file-in processing of the step 507.

Figure 6:
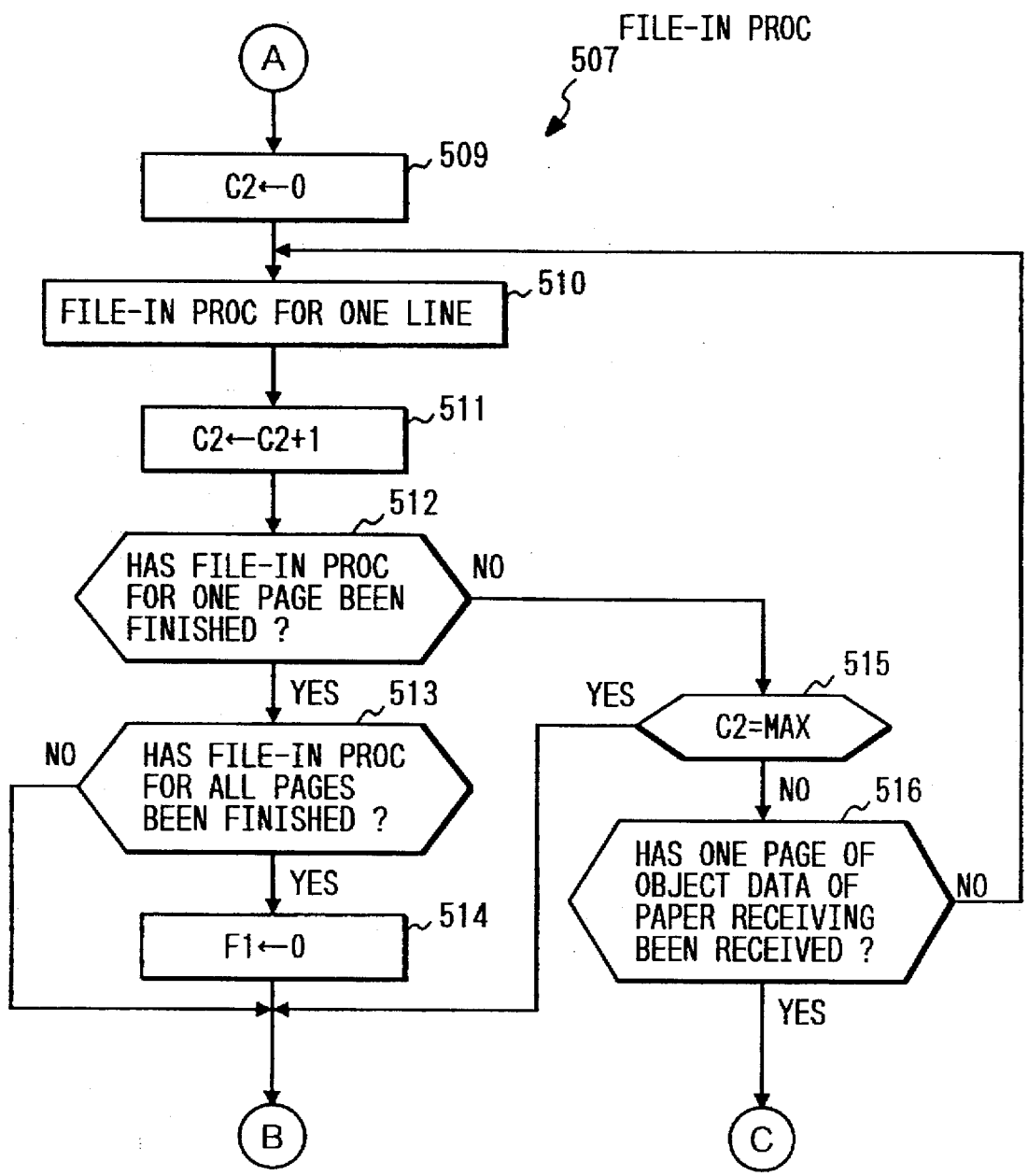
FIG. 6 shows a flow chart of this embodiment of this invention for showing the file-in processing of step 507 shown in FIG. 5.

FIG. 6 shows a flow chart of this embodiment of this invention for showing the file-in processing of step 507 shown in FIG. 5. This processing is substantially the same as the flow showing the file-in processing shown in FIG. 3.

That is, the line counter C2 is cleared in step 509, and then one line of the original copy is read and coded. The coded data is stored in the video memory 6 in step 510. Then, the line counter C2 is increased by one. Then, the CPU makes a decision as to whether or not one page of the original copy has been read and coded (steps 509→510→511→512). If the reading and coding processing does not reach the end of one page, the CPU 1 judges whether the value of the line counter C2 reaches the predetermined value MAX (step 512→515). If the value does not reach the MAX, processing proceeds to step 516 where the CPU 1 checks whether one page of the object data of the paper receiving has been received entirely.

The difference between the flow of FIG. 6 and that of FIG. 3 is in the step 516 which is the same judgement to the step 500. If one page of the object data of paper receiving is not received, processing returns to step 510.

If completion of executing the step 510 results in finishing of one page of reading and coding, the CPU 1 judges whether there is next copy to be read out. If there is no next copy, the CPU 1 resets the file-in demand flag F1 and ends this processing (step→512→513→514). If there is a next page, the CPU 1 ends this processing without resetting of the flag F1. Moreover, if this processing is halfway one page, the CPU 1 ends this processing without the resetting of the flag F1 in the case that the line counter C2 reaches the MAX.

Though the file-in processing is halfway one page, and the value of the line counter C2 does not reach the MAX, if the CPU 1 recognizes that one page of the object data of paper receiving has been received in step 516, the CPU 1 interrupts the file-in processing halfway one page and jumps to step 508 where the CPU 1 straight effects the paper receiving and decoding processing for the object data of pages which has been received. Then, the processing proceeds to the file-in processing of the step 507 again through the route mentioned above.

MEMORY RECEIVING PROCESSING

Figure 7:
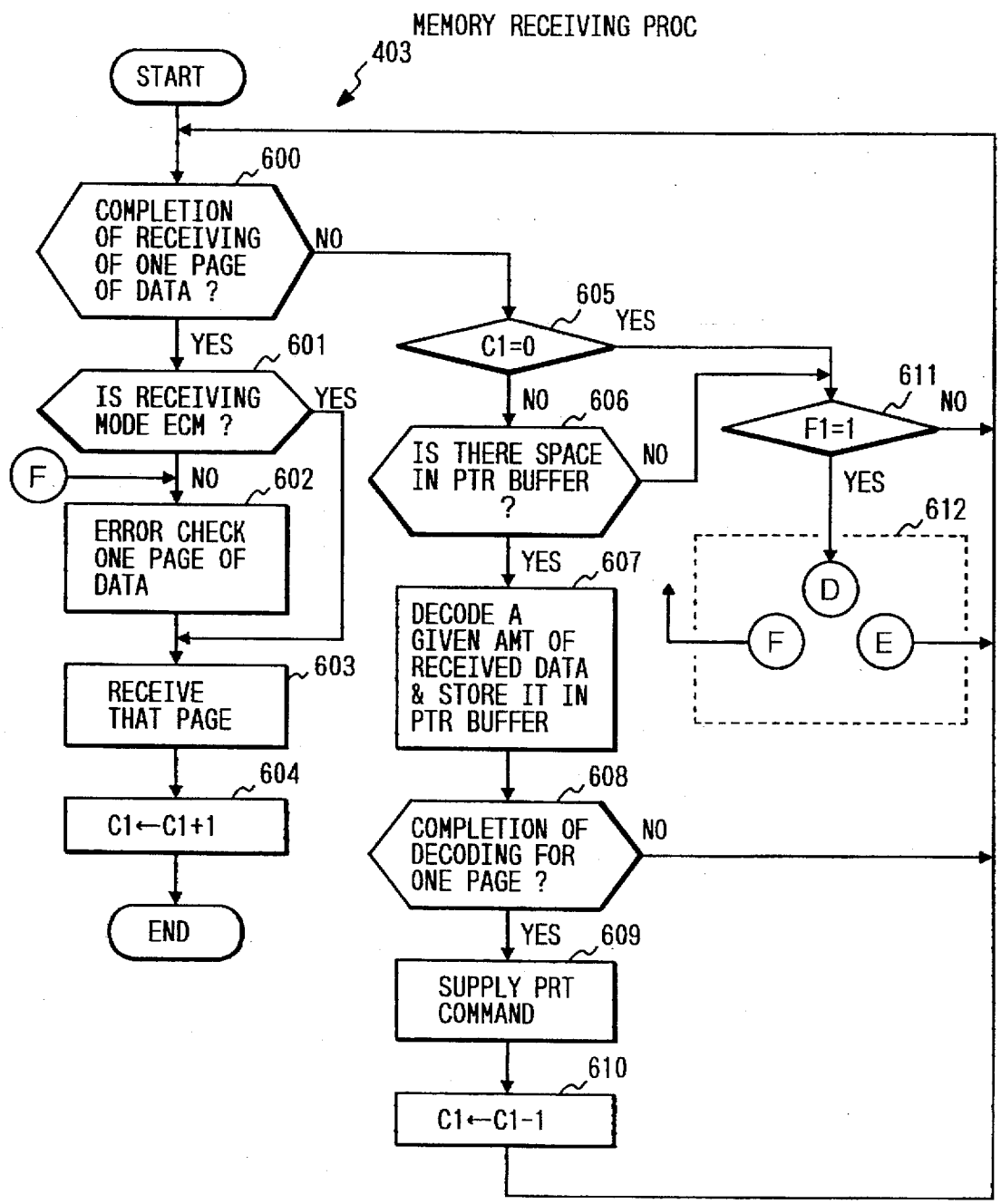
FIG. 7 shows a flow chart of this embodiment for showing the memory receiving processing of step 403 shown in FIG. 4.

FIG. 7 shows a flow chart of this embodiment of this invention for showing the memory receiving processing of step 403 shown in FIG. 4. As mentioned above, the memory receiving processing is divided into a pre-processing for receiving data in pages and post-processing for decoding the received one page of data and storing the decoded data into the printer buffer 19. If the receiving mode is in the non-ECM mode, the pre-processing includes an error checking processing in non-ECM mode.

PRE-PROCESSING

The memory receiving processing starts at step 600. The CPU 1 checks whether or not all of one page of received data has received in step 600. Here, it is assumed that one page of the object data to be processed has been received. In the following step 601, the cpu 1 checks whether or not the receiving mode is the ECM mode. If the receiving mode is the ECM mode, the CPU 1 adds a reception mark to the one page of decoded video data stored in the receiving buffer area of the video memory 6 and increases the page counter C1 (the initial value is zero) for counting the number of pages received by one (step 601→603→604). Then, the pre-processing has finished and processing exits this memory receiving processing temporarily.

If the receiving mode is the non-ECM mode, processing proceeds from step 601 to 602 where an error check processing by the coding/decoding circuit 16 is effected in a lump for one page of coded video data stored in the receiving buffer area of the video memory 6. Then, CPU 1 adds the reception mark to the video data of that page and increases the page counter C1 (step 603→604) and then, processing exits this memory receiving processing temporary.

POST-PROCESSING

During receiving of one page of data to be processed, the post-processing or the file-in processing is executed. In step 600, if the answer is NO, processing proceeds to step 605 to check the value of the page counter C1. If the value of the page counter C1 is not zero, this means that the received coded video data which should be subjected to the post-processing is stored in the video memory 6. If data to be subjected to the post-processing is stored in the video memory 6, processing proceeds to step 606 where the CPU 1 checks whether a space capable of storing more than a predetermined amount of data in the printer buffer 19 in which the decoded data after the post-processing is stored.

If there is the space in the printer buffer 19, processing proceeds to step 607 and a predetermined amount of the object data in the video memory 6 is decoded and the decoded data is stored in the printer buffer 19. In this processing, the CPU 1 checks whether the processing of one page of data has been finished in the following the step 608. Then, until completion of one page of processing, processing returns to step 600, that is, processing repeats steps 600→605→606→607→608→600 until the judgement in the step 600 will change.

If one page of processing has been finished by executing of step 607, processing proceeds to step 609. Then, the CPU 1 supplies the print command to the printer interface 18 and the memory control portion 20 and then in the following step 610, the CPU 1 decreases the page counter C1 by one and returns to step 600.

IN THE CASE THAT FILE-IN DEMAND FLAG F1 IS RESET

If one page of receiving of the object data to be subjected to the processing has not been received and there is no data for the post-processing or there is no space in the printer buffer 19 though there is data for post-processing, processing proceeds to step 611, where the CPU 1 checks the condition of the file-in processing demand flag F1. If the flag F1 is reset, processing returns to step 600.

IN THE CASE THAT THE FILE-IN FLAG F1 IS SET

Figure 8:
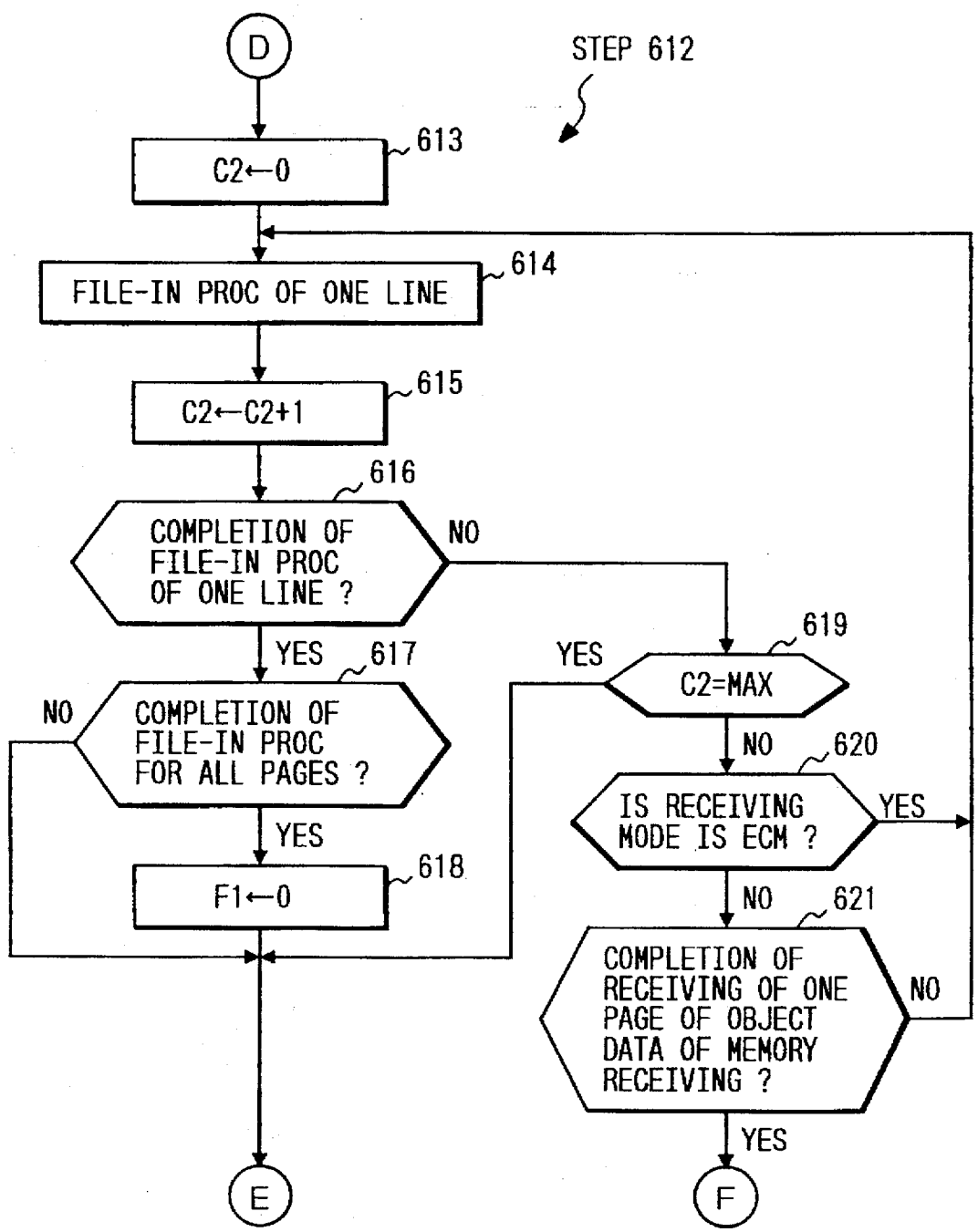
FIG. 8 shows a flow chart of this embodiment for showing the file-in processing of the step 612 shown in FIG.

In the step 611, if the CPU 1 recognizes that the flag F1 is set, processing enters the file-in processing of step 612. FIG. 8 shows a flow chart of this embodiment of this invention for showing the file-in processing of the step 612. This processing is substantially the same as the file-in processings shown in FIGS. 3 and 6.

That is, the line counter C2 is cleared, and then one line of the original copy is read and coded. The coded data is stored in the video memory 6. Then, the line counter is increased by one. Then, the CPU 1 makes a decision as to whether or not one page of the original copy has been read and coded (steps 613→614→615→616). If the reading and coding processing does not reach an end of the page, the CPU 1 judges whether the value of the line counter C2 reaches the predetermined value MAX (step 616→619). If the value does not reach the MAX, processing proceeds to step 620 where the CPU 1 checks whether the receiving mode under processing is ECM or the non-ECM mode. If the receiving mode is ECM mode, processing returns to one line reading and coding processing of step 614. In this case, this file-in processing is the same as that show in FIG. 3.

In the non-ECM mode, processing proceeds to step 612, the CPU 1 checks whether one page of data to be subjected to the preprocessing of the memory receiving has been received in step 621. The difference between this file-in processing and the other file-in processings is in the judgement of steps 620 and 621. If one page of object data of the preprocessing has not been received, processing returns to the one line reading and coding processing 614.

If execution of step 614 finishes the one page of recording and coding, the CPU 1 checks whether or not there is a next original copy to be read in step 617. If there is no following page, CPU 1 resets the file-in demand flag F1 and finishes this memory receiving processing (616→617→618). If there is a following page, the CPU 1 finishes this processing without resetting of the flag F1. Moreover, if the processing is in the middle of one page, if the value of the line counter C2 reaches the MAX 2, the CPU 1 finishes this processing without resetting of the flag F1.

If the file-in processing is in the middle of one page and the line counter C2 does not reach the MAX2 but the receiving mode is the non-ECM mode, and the CPU 1 recognizes that one page of the object data to be subjected to the pre-processing of the memory receiving processing in step 621, the CPU 1 interrupts the file-in processing in the middle of the page and jumps to step 602 to executes the lump error check processing of the data of pages which has been received. Then, processing enters the file-in processing of the step 612 again via the route mentioned earlier.

Figure 9:
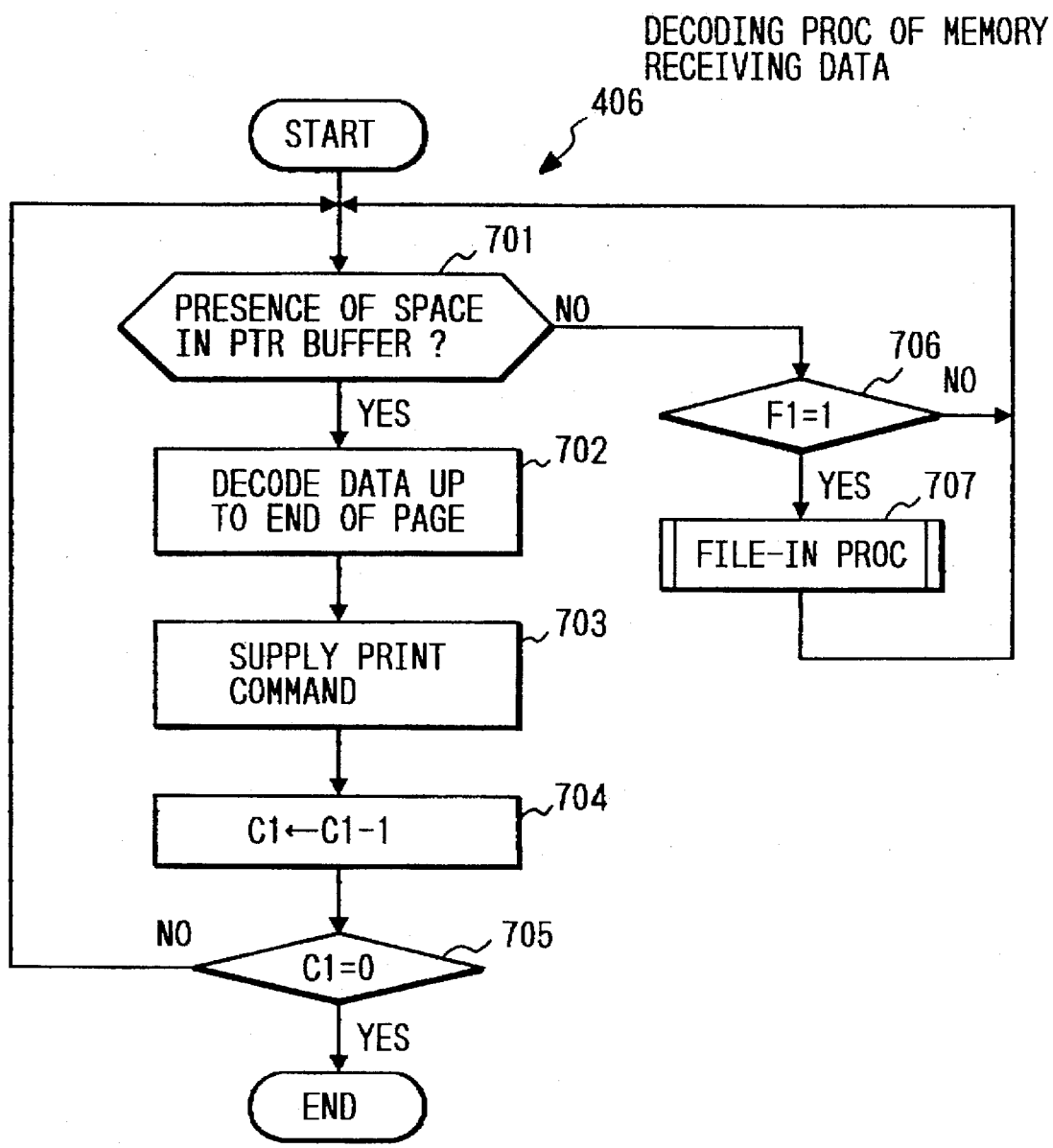
FIG. 9 shows a flow chart of this embodiment for showing a coding process of data in the memory receiving process shown in FIG. 4.

FIG. 9 shows a flow chart of this embodiment of this invention for showing a coding process of data by the memory receiving process shown in FIG. 4. This processing treats the remaining processing in the post-processing of the memory receiving processing of the step 403. This processing of step 707 can be executed in parallel.

At first, in step 701, the CPU 1 checks whether there is a space capable of storing more than a predetermined amount of data in the printer buffer 19. If there is the space, processing proceeds to step 702, the CPU 1 decodes the coded video data in the video memory 6 up to the end of the page and stores the decoded data in the printer buffer 19. In the following step 703, CPU 1 supplies the print command to the printer interface 18 and the memory control portion 20. Then, the CPU 1 decreases the page counter C1 by one and checks whether the value of the counter C1 becomes zero (step 704→705). If the page counter C1 is zero, this means that the remaining processing of the post-processing of the memory receiving has entirely finished, so that processing exits this processing and the CPU 1 resets the receiving data demand flag F2 in step 407 shown in FIG. 4.

If the page counter C1 is not zero, processing returns from step 705 to the first step 701 where the CPU 1 checks whether there is the space in the printer buffer 19. If there is no space in the printer buffer 19, processing proceeds to step 706 and check the condition of the file-in demand flag F1. If the flag F1 has not been set, the CPU 1 waits until the space is provided in the printer buffer 19. If the flag F1 has been set, processing proceeds to the file-in processing of step 707. The file-in processing is the same as the file-in processing shown in FIG. 3. The CPU 1 executes the file-in processing of one page and exits this decoding processing of memory receiving data.

OVERLAPPING OF CODE CONVERSION AND TRANSMISSION OPERATION WITH FILE-IN OPERATION

TIME DIVISION OF BOTH OPERATIONS

Figure 10:
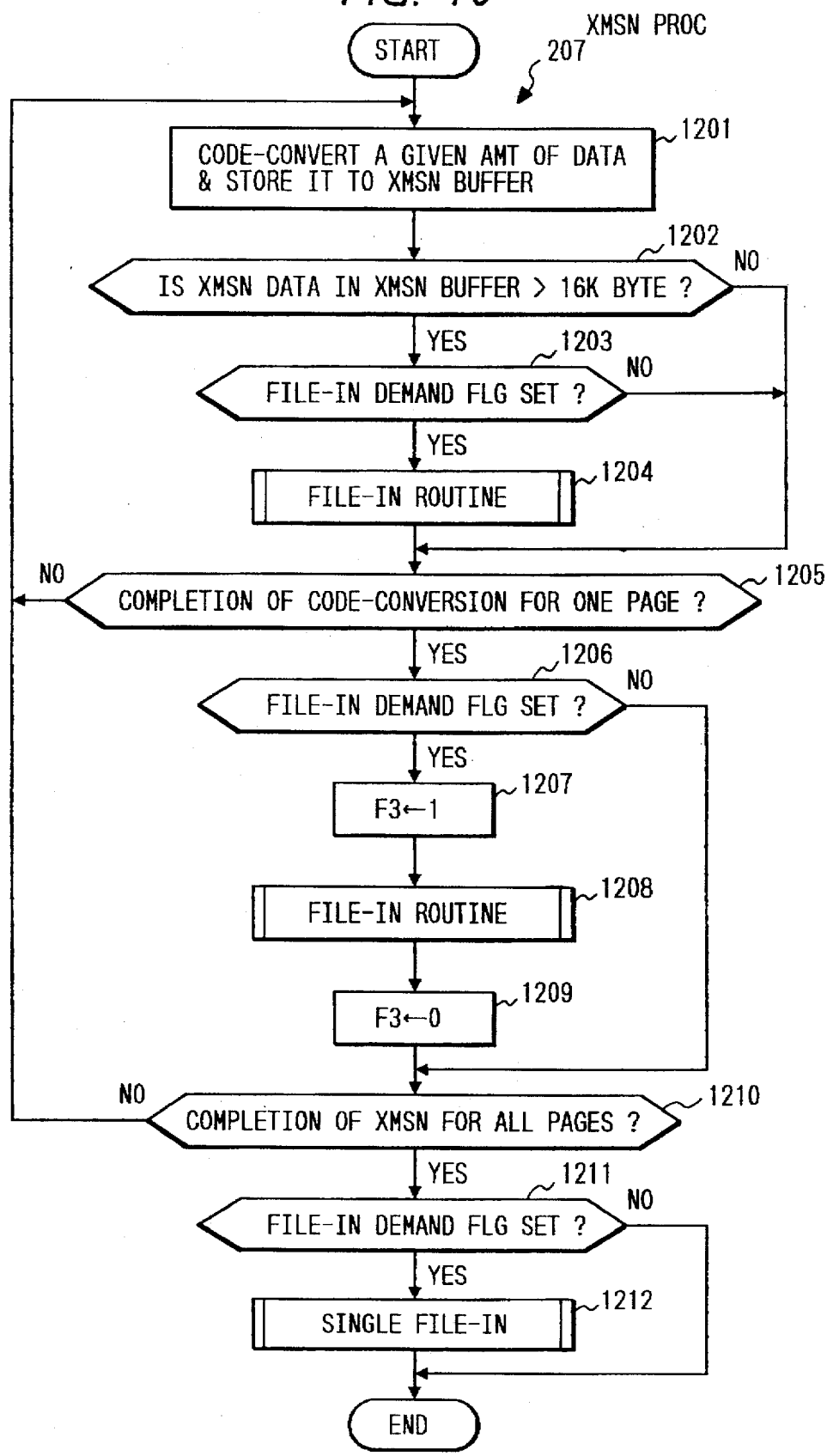
FIG. 10 shows a flow chart of this embodiment for showing a transmission processing of step 207 shown in FIG.

FIG. 10 shows a flow chart of this embodiment for showing a transmission processing of step 207 shown in FIG. 2. The transmission processing starts at step 1201. In step 1201, the CPU 1 transfers a predetermined amount of MR coded object data to be transmitted in the video memory 6 to the coding/decoding circuit 16 to convert the object data to MMR coded data and stores the MMR coded data in the transmission buffer in the video memory 6.

Execution of the step 1201 results in storing of code-converted transmission data of a plurality of bytes in the transmission buffer (video memory 6). As mentioned earlier, every execution of the transmission data demand interruption in response to the modem 5 results in decrease in byte of the transmission data stored in the transmission buffer by one byte.

The code-conversion and transmission processing is executed every page. During the processing of one page, if the file-in demand flag is set, the code-conversion processing is repeated until the transmission data of 16K bytes is stored in the transmission buffer (step 1201→1202→1205→1201). Moreover, if the user performs the file-in operation after setting of original copies on the scanner during the code-conversion and transmission operation, the file-in demand flag is set in response to an interruption from the panel control portion 9.

If the transmission data more than 16K bytes is stored in the transmission buffer, the file-in routine is executed if the file-in demand flag is set (step 1203→1204). As mentioned later, during the file-in routine of the step 1204, an amount of transmission data in the transmission buffer is checked repeatedly. If the amount of the transmission data is less than 8K bytes, processing exits the file-in routing 1204 and returns to the main routine of the transmission processing. This file-in processing of step 1204 executed within a page is referred to as "within-page file-in processing".

When code-conversion processing of step 1201 for one page of data is finished, processing proceeds from step 1205 to 1206 where a file-in routine is executed if the file-in demand flag is set (1207→1208). When code-conversion processing for one page of data is finished, the CPU 1 waits returning of the reception confirmation signal of one page of data from the communication partner after one page of transmission data has been transmitted to the telephone line entirely. That is, the CPU 1 does not start the code-conversion processing for data of the next page until the modem 5 sends one-page transmission completion information to the CPU 1. The CPU 1 executes the file-in routine during this waiting period of code-conversion between pages. This file-in processing of step 1208 executed between pages is referred to as "between-page file-in processing". As mentioned later, in the between-page file-in processing of step 1208, the CPU 1 checks whether or not one-page transmission completion information is sent from the modem 5 repeatedly. If the one-page transmission completion information is incoming, processing exits from the subroutine of the file-in routine of step 1208 to the main routine of the transmission processing.

In step 1207, CPU 1 sets a flag F3 to distinguish the within-page file-in processing of step 1204 from the between-page file-in processing of step 1208 and enters the processing of step 1208. Then, after the processing of step 1208, the CPU 1 resets the flag F3 in step 1209.

Processing returns from step 1210 to 1201 to repeat the above-mentioned processing until the code-conversion and transmission processing is finished over all pages of the object data to be transmitted.

Figure 11:
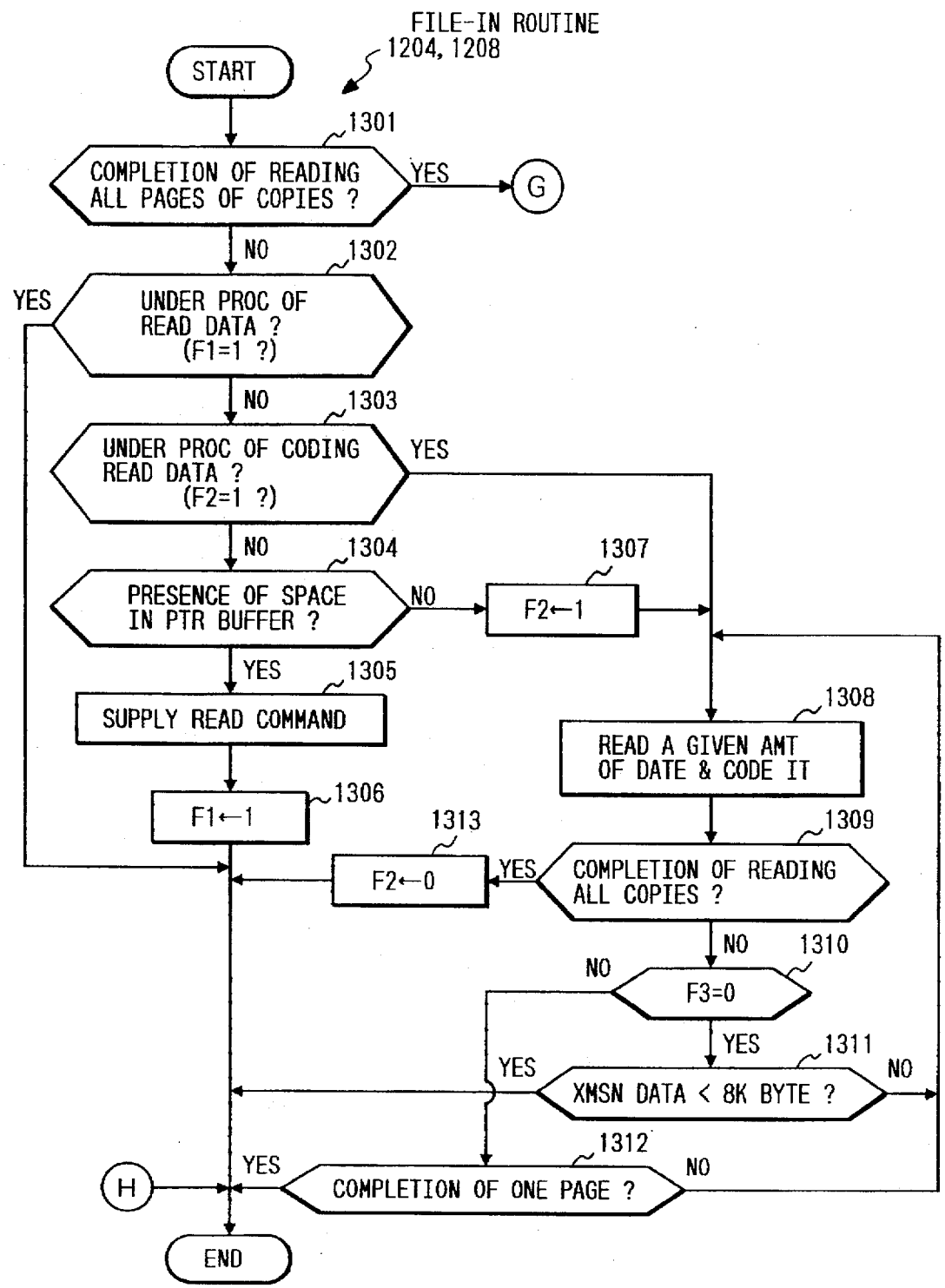
FIGS. 11 and 12 show a flow chart of this embodiment for showing the file-in routine of steps 1204 and 1204 shown in FIG. 10.
Figure 12:
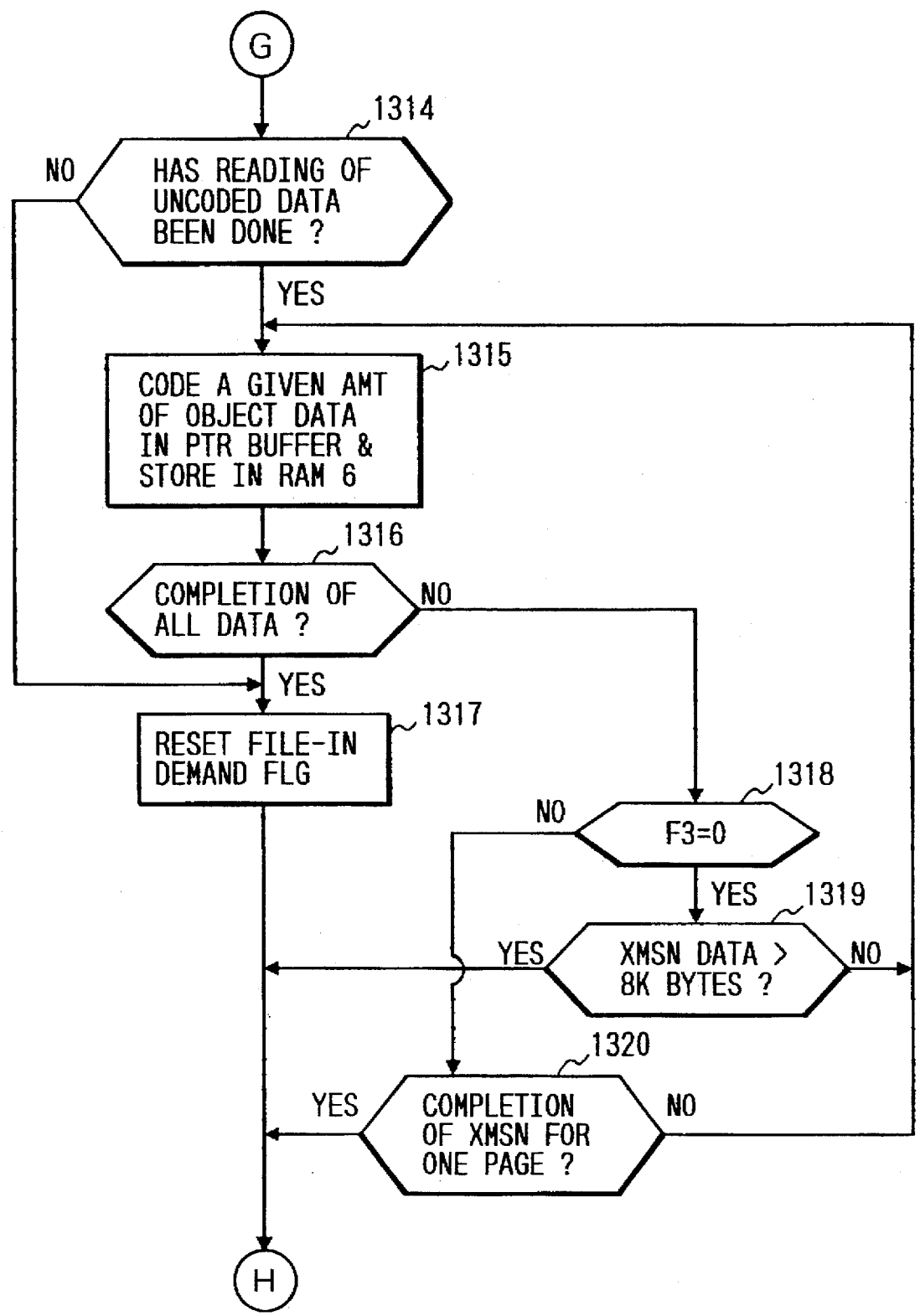
Figure 13:
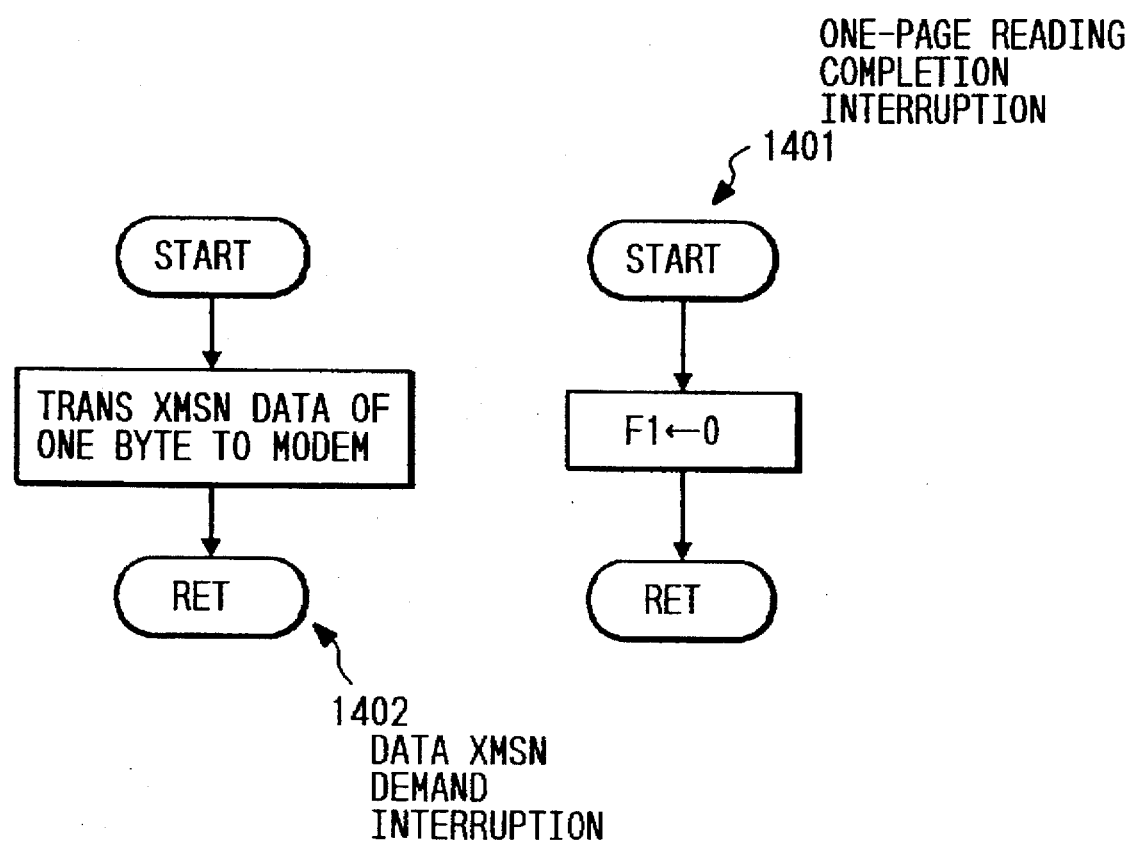
FIG. 13 shows a flow chart of this embodiment for showing interruption processings.

FIGS. 11 and 12 show a flow chart of this embodiment for showing the file-in routine of steps 1204 and 1204 shown in FIG. 10. This file-in routine processing is divided into three portions.

If there is the space capable of storing the predetermined amount of data in the printer buffer 19, the CPU 1 executes the reading operation of one page of original copy.

If there is no space capable of storing the predetermined amount of data in the printer buffer 19, the CPU 1 executes the reading and coding operation 1̂ mentioned above.

When the original copy is read, the CPU 1 executes the coding processing 2̂ mentioned above.

Hereinbelow will be described the operation of the file-in routine with reference to FIGS. 11 and 12 more specifically. In step 1801, the CPU 1 checks whether all pages of original copies have been read. When the reading has not been finished, processing proceeds to step 1802 where the CPU 1 checks whether or not the flag F1 indicative of the uncoding read out mode is set. Because the flag F1 is initially reset, processing proceeds to step 1808. In step 1308, the CPU 1 checks whether the flag F2 indicative of the condition under reading and coding processing. Because the flag F2 is initially reset also, processing proceeds to step 1804, the CPU 1 checks whether or not there is the space capable of storing the predetermined amount of data in the printer buffer 19.

If there is the space in the printer buffer 19, processing proceeds to step 1805 where the CPU 1 supplies the reading command to the scanner control portion 14, selector 15, and the memory control portion 20. In the following step 1806, the CPU 1 sets the flag F1 and exits this subroutine and returns to the main routine of the file-in routing of step 1204 and 1208. The scanner control portion 14, selector 15, and the memory control portion 20 receiving the reading command reads one page of original copy in the reading mode. When one page of the original copy has been read, the scanner control portion 14 informs the CPU 1 of the completion of the reading. FIG. 18 shows a flow chart of this embodiment for showing interruption processings. In response to the information, the CPU 1 executes a one-page reading completion interruption processing 1401 and resets the flag F1.

In the above-mentioned processing, on first execution of the file-in processing, processing returns from step 1306 to the main routine. In the second execution of the file-in processing if the one page of reading has not completed, processing exits this subroutine form the step 1302 because the flag F1 remains set. In the third execution of the file-in processing, if the flag F1 has been reset and there is the space in the printer buffer 19, processing proceeds 1301→1302→1303→1304→1305→1306 and exits this subroutine. That is, the reading data processing is started for the second page.

On the i$^{th}$ execution of the file-in processing (i is a natural number), if there remains a copy to be read, processing is not under the reading processing, and there is no space in the printer buffer 19, processing proceeds step 1301→1302→1303→1304→1307→1308. That is, the CPU 1 sets the flag F2 and starts the reading and coding processing for the next page. However, in the first execution of the step 1308, the CPU 1 does not execute the reading and coding processing for the whole one page of the original copy but the reading and coding processing is executed for a predetermined number of lines or a predetermined amount of data. In the following step 1309, the CPU 1 checks whether the reading for all pages of copies has completed by the execution of the just prior step 1308. If the reading has not completed, the CPU 1 judges whether or not processing should exit this subroutine and returns to the main routine.

The condition of returning to the main routine is different between the within-page file-in processing (step 1204) and the between-page file-in processing (step 1208). In the within-page file-in processing, the returning condition is that the amount of transmission data in the video memory 6 decreases less than 8K bytes. The CPU 1 repeats processing of steps 1308→1309→1310→1311→1308 to executes the reading and coding processing every given amount of data until the condition is satisfied. If the amount of the transmission data is less than 8K bytes, processing returns to the main routine and executes the code-conversion processing to increase the amount of the transmission data more than 16 k bytes. If the amount of the transmission data is more than 16K bytes, the CPU 1 executes the file-in routine, to progress the reading-and-coding processing.

In the between-page file-in processing, the condition of returning to the main routine is that the modem 5 sends the one-page-transmission completion information to the CPU 1. Until this condition is satisfied, the CPU 1 repeats executing of the processing of steps 1308→1309→1310→1312→1308 to progress the reading-and-coding processing.

If the reading processing for all pages has been finished as the result of the reading-and-coding processing by the predetermined amount of data in step 1308, processing proceeds from step 1309 to step 1313 where the CPU 1 resets the flag F2 and returns to the main routine. Then, at the next execution of file-in processing, the decision is determined as YES in the step 1301 and processing proceeds to step 1314.

In step 1314, the CPU 1 checks whether or not the reading processing has been executed in the file-in processing. If the reading processing has not been done, this condition means that the file-in processing has been completed, so that CPU 1 resets the file-in demand flag and returns to the main routine. If the reading processing has been done, it is necessary to code the read data in the printer buffer 19 and transfer the coded data to the video memory (RAM) 6. Thus, the processing proceeds to step 1315, where the coding processing is executed. However, whole object data is decoded during one processing but a predetermined lines of data is subjected to the coding processing.

In the following step 1316, the CPU 1 checks whether or not processing for all data in the printer buffer 19 has been completed as the result of the coding processing of the predetermined amount of data in step 1315. If it has not been completed, the CPU 1 judges whether or not processing should exit this subroutine and returns to the main routine.

The condition of returning to the main routine of the within-page file-in processing (step 1204) is different from that of the between-page file-in processing (step 1208). The condition of the within-page file-in processing is that the amount of the transmission data in the video memory 6 decreases less than 8 k bytes. Until this condition is satisfied, the CPU 1 repeats the processing of steps 1315→1316→1318→1319→1315. If the amount of the transmission data is less than 8K byte, processing returns to the main routine, where the CPU 1 executes the code-conversion processing to increase the transmission data more than 16K bytes. If the transmission data increases more than 16K bytes, the CPU 1 executes the file-in routine to progress the coding processing.

On the other hand, in the between-page file-in processing, the condition of returning to the main routine is reception of the one-page-transmission completion information from the modem 5 by the CPU 1. Until this condition is satisfied, the CPU 1 repeats processing of steps 1315→1316→1318→1320→1315 to progress the coding processing.

If the coding processing for all object data in the printer buffer 19 has been finished as the result of the coding processing for the predetermined amount of data in step 1315, processing proceeds from step 1316 to 1317, and the CPU 1 resets the file-in demand flag F1 and returns to the main routine. This completes the file-in processing.

Figure 14:
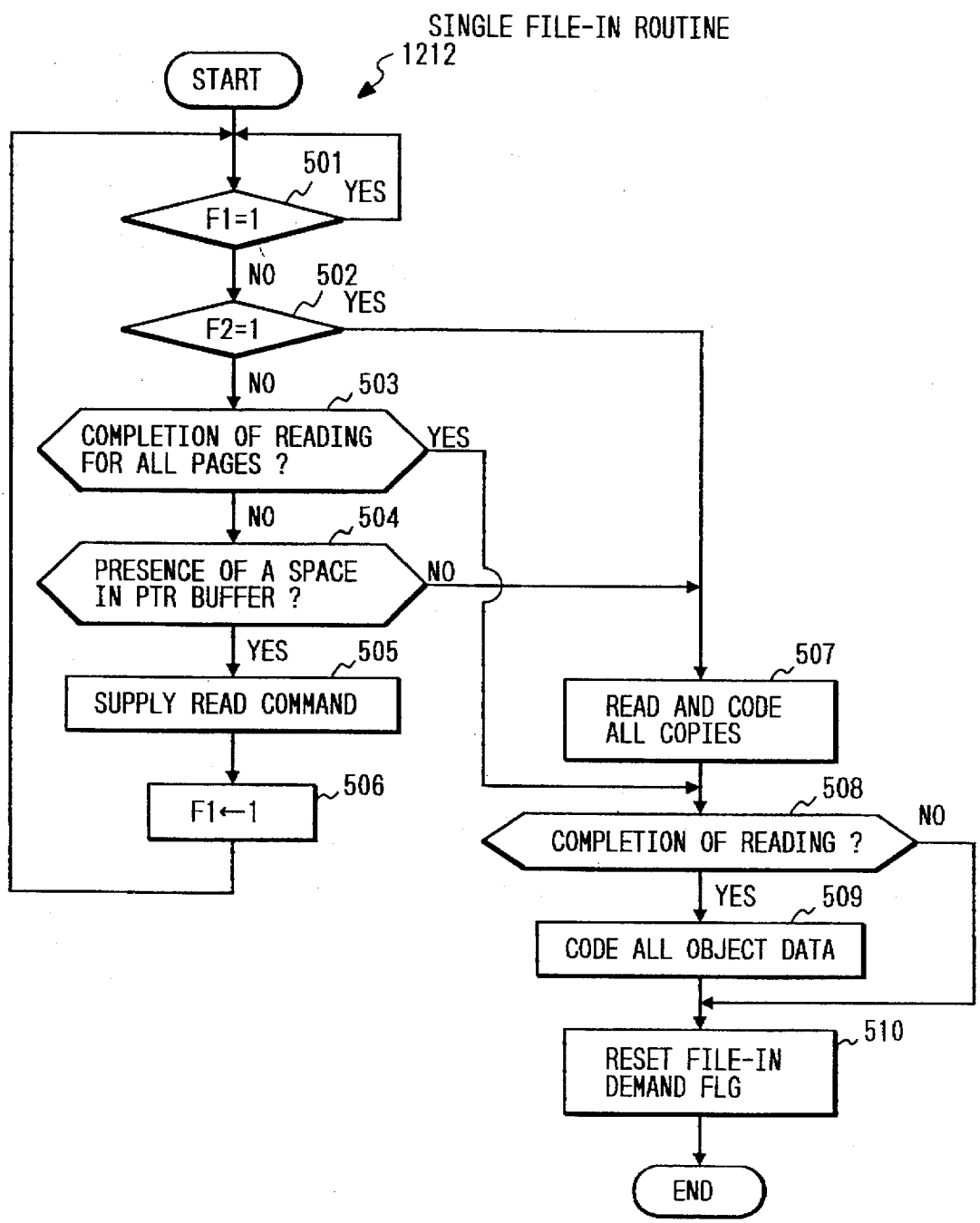
FIG. 14 shows a flow chart of this embodiment for showing the single file-in processing of step 1212.

Here, the code-conversion and transmission processing may be completed before the completion of the file-in processing sometimes. In such a case, as shown in FIG. 2, if the file-in demand flag F1 remains set at the instance of completion of transmission, the CPU 1 executes processing of steps 1210→1211→1212 and executes and completes the remaining processing of the file-in processing independently in step 1201. FIG. 14 shows a flow chart of this embodiment for showing the single file-in processing of step 1212. In the single-file-in processing, it is not necessary to process in a time-division manner. That is, it is unnecessary to return to the code-conversion and transmission processing. Thus, the CPU 1 completes the remaining processing and resets the file-in demand flag F1 in accordance with the progression of the file-in processing.

SINGLE FILE-IN PROCESSING

As described earlier, when the file-in processing is executed independently, the reading of copies can be done smoothly by effectively using the printer buffer 19 as follows:

If there is the space capable of storing a predetermined amount of data in the printer buffer 19, the CPU 1 executes the reading processing mentioned above.

If there is no space capable of storing the predetermined amount of data in the printer buffer 19, the CPU 1 executes the reading and coding processing $\hat{1}$ mentioned earlier.

If the original is read in the reading mode; the CPU 1 executes the coding processing $\hat{2}$.

DATA PROCESSING UNIT OF CODING/DECODING CIRCUIT 16

In order to executes the decoding processing accompanied with the receiving data processing and the coding processing accompanied with the file-in processing time-division manner within a page using one coding/decoding circuit 16, it is necessary to distinguish these processings by lines. Inputting and outputting of data of the coding/decoding circuit 16 is executed in bytes, so that in order to executed this time-divided processing simply, plural bytes of data of one line should not include data of other lines. As well known, at the end of the line, a line end code is added. Here, it should be prevented that data of the next line follows one byte of data including this line end code without an interval.

Then, in this invention, if the line end code does not agree with the end of one byte when the video data is MR-coded and stored into the video memory 6 in the file-in processing, the appropriate number of zero-fills are added to after the line end code to form one byte data, so that data of the next line starts from a new one byte data. This can be done by setting a parameter determining an operation mode of the coding/decoding circuit 16 appropriately.

Because the zero-filling effected in lines increases the redundancy, this has not been done. However, in this invention it is desirable to effect zero-fill in lines. Here, the zero-fill is as follows:

When one line includes a small amount of data, data "0" are added to the end of the data so that the transmission interval exceeds a predetermined interval for one line data transmission.

LINE CONTROL

As mentioned above, an internal control of the facsimile apparatus effecting a plurality of processings in parallel using only one coding/decoding circuit 16. This control should be done in consideration of the telephone line control. That is, if during the operation of printing of data which had been received, the facsimile apparatus receives new different data, the coding/decoding circuit 16 should perform the decoding of the data which had been received and the error check of new received data. In the facsimile control protocol, when the MPS indicative of an end of a page sent from the transmission side, the receiving side must executes an error checking of the received data and send some response to the transmission side according to the article of CCITT. If the sending of the response signal is delayed, the line is disconnected and there is a possibility of occurrence of an communication error. Therefore, the error checking of the received data should be prior to the printing operation. In this invention, in response to reception of the MPS signal indicative of an end of a page, the printing operation for the data which had been received is interrupted and the coding/ decoding circuit 16 is used for the error checking of the new incoming data. The MPS signals repeatedly sent during the error checking are neglected and when the error checking has been finished, an response signal is sent and restarts the printer operation.

Figure 15:
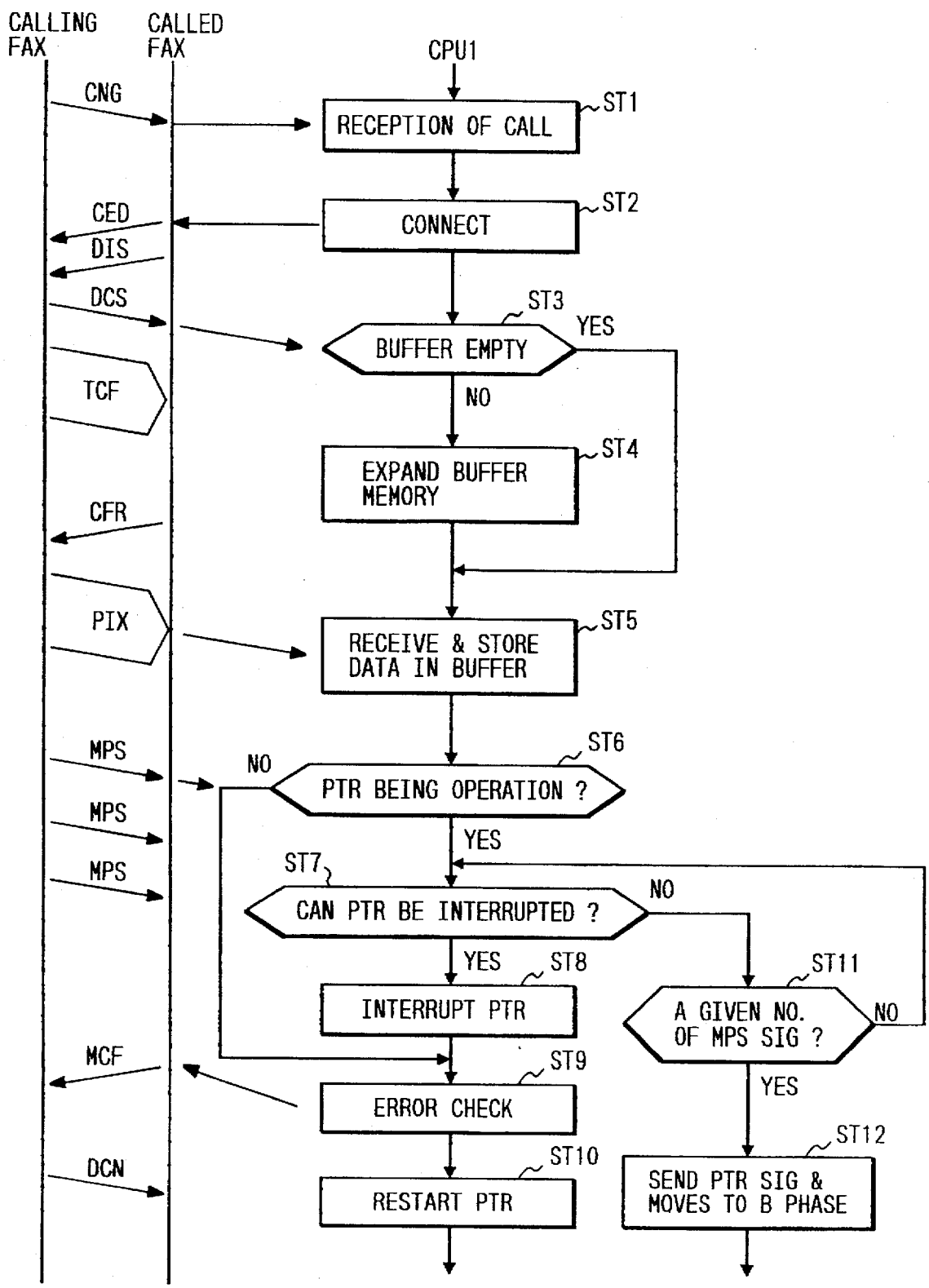
FIG. 15 shows a flow chart of this embodiment for showing a control in the case of reception of a calling during printing of data.

FIG. 15 shows a flow chart of this embodiment for showing a control in the case of reception of a call during printing of data which had been received.

In step st1, the CPU 1 receives a new call during the printing of data which had been received. In the following step st2, the CPU 1 connects the NCU 4 with the telephone line though due to the printing operation the coding/ decoding circuit 16 is used for decoding of the data which had been received. In the following step st3, the CPU 1 checks whether or not there is the space for storing the new received data in the receiving buffer area of the video memory 6. If there is no space in the buffer area, the CPU 1 expands the receiving buffer area of the video memory 6 in step st4. If there is the space in the receiving buffer area, the CPU 1 sequentially stores the data in the receiving buffer area in step st5.

Here, when the receiving operation for one page of the new receiving data has finished and the MPS signal is incoming there, the CPU 1 checks whether the printer 17 is being operated in step st6. If the printer 17 is operating, the CPU 1 checks whether or not the operation of the printer 17 can be interrupted, that is, the CPU 1 checks whether or not the printer is printing one page of data in step st7. If the condition of the printer 17 is after one page of data has been printed and before start of printing of the next page, it is possible to interrupt the operation of the printer 17, so that the CPU 1 sends a command of interruption of the printing operation. Here, when the coding/decoding circuit 16 finishes decoding of one page of received data, it is possible that the CPU 1 causes the coding/decoding circuit 16 to interrupt the decoding processing and to effect the error checking of new received data. However, it is surer that the CPU 1 interrupts the operation of the printer 17 and causes the coding/decoding circuit 16 to effects the error checking of the new received data in consideration of occurrence of a trouble in the printing operation.

In step st7, if the printing operation can be interrupted, the CPU 1 sends an operation stop command to the printer 17 in step st8 and operates the coding/decoding circuit 16 to effect the error checking of the received data stored in the receiving buffer area of the video memory 16 in step st9. When the error checking has finished, the CPU 1 sends the MCF signal indicative of reception of data to the telephone line 21 and restarts the operation of the printer 17 to print out the remaining pages in step st10.

In step st7, if the printer 17 cannot be interrupted, the CPU 1 judges whether or not the MPS signals is detected more than a predetermined times (in this embodiment, three times) in step st11. If the number of detections is less than three, processing returns to step st7 where the CPU judges whether the operation of the printer can be interrupted. If the number of times is more than three, the CPU does not effect the error check and sends a response indicative of reception of the data and sends a RTP signal indicative of moving to phase B in step st12. Thus, the communication condition returns to phase B and then, determination of the transmission and receiving modes and confirmation of the synchronizing condition are effected again in the case that the operation of the printer 17 cannot be interrupted even if the MPS signals are neglected three times. Therefore, the connection of the telephone line is maintained until the operation of the printer 17 is interrupted. If the communication procedure proceeds to phase C, the reception of the next page is effected.

As mentioned above, if a new reception of a call during the operation of the printer 17, the new data is received and CPU 1 sends the stop command to the printer 17 in response to the reception of the MPS signal. The CPU 1 neglects the following MPS signals until the operation of the printer can be interrupted. Then, when the operation of the printer 17 becomes to be interrupted, the CPU 1 starts the error checking of the new received data, so that the operation of the printer is not troubled. Further, without interruption of the facsimile communication procedure, the decoding and printing operations of the received data and the error checking of the new received data can be effected by one coding/decoding circuit 16 in parallel.

Hereinbelow will be described a controlling in the case that there is a new call during an operation of decoding/printing of data in the video memory 6.

In this embodiment, the receiving buffer for storing the received data is provided by setting the receiving buffer area in the video memory 6. Therefore, if there is a new call during the printing operation using decoded received data stored in the video memory 6, there is a possibility that the operation of the facsimile apparatus may be uncontrollable because the data to be printed and received data are stored in the same video memory 6 with confusion. That is, the received data stored in the video memory is transferred to the receiving buffer area, and then is sent through the system bus B1 and decoded by the coding/decoding circuit 16 every predetermined lines. Then, the decoded data is sequentially stored in the printer buffer 19 through the bus B2 and printed by the printer 17. Therefore, there is the data which had been received and sent to the coding/decoding circuit 16 and the incoming received data, so that the uncontrollable state occurs. This can be resolved by causing the caller to wait the response by delaying the connection with the telephone line until the receiving buffer totally sends the received data and the printer 17 finishes the printing operation.

However, though the caller is forced to wait until the stop of the printer operation, it is impossible to immediately start the receiving of data after the stop of the printer because it is necessary to execute a pre-procedure of the facsimile communication before the reception of the data after the connection of the telephone.

Then, in this facsimile apparatus, if there is a call during the printing operation, the receiving of video data from the telephone line can be started immediately as soon as the printer 17 stops by immediate connection with the telephone line. In this case the CPU 1 sends the stop operation command to the printer 17 after the connection with the telephone line. Then, if there is no response indicative of the stop of operation from the printer 17 until completion of training, the start of receiving of video data is held over.

Figure 16:
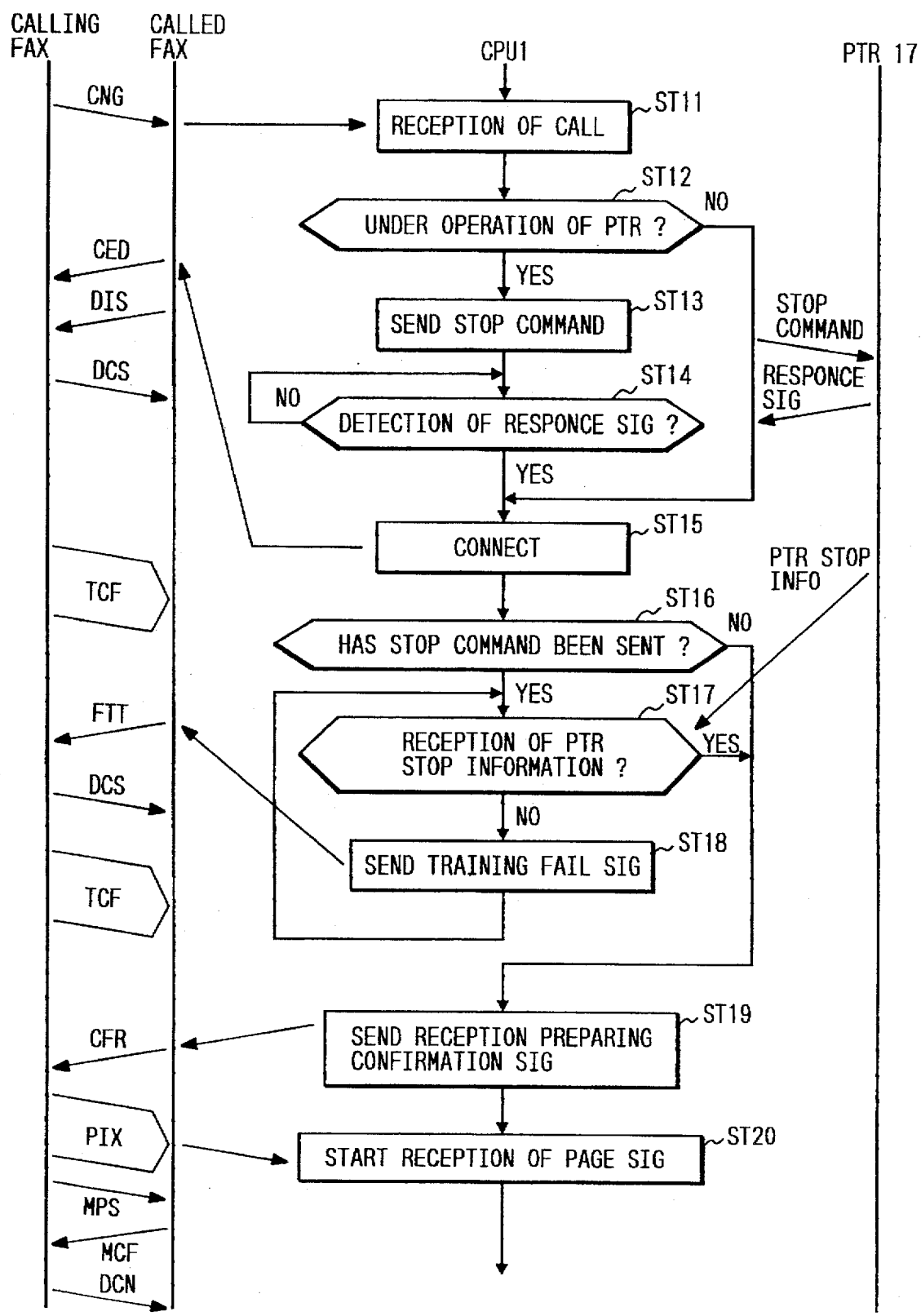
FIG. 16 shows a flow chart of this embodiment for showing an operation of reception of a call during the printing operation.

The controlling in the case of new calling during the printing operation of data stored in the video memory 6 will be described. FIG. 16 shows a flow chart of this embodiment for showing an operation of reception of a call during the printing operation.

When the CPU 1 receives a call in step ST11, the CPU 1 judges whether or not the printer 17 is operating in step ST12. If the printer 17 is operating, the CPU 1 supplies the stop operation command to the printer 17 in step ST13. In step ST14, the CPU 1 detects a response signal from the printer 17. Then, the CPU 1 supplies a line connection command to the modem 5 in step ST15, so that the telephone line is connected.

In the following step ST16, the CPU 1 judges whether or not the stop operation command has been sent. Because in the step ST13, the stop operation command was sent, processing proceeds to step ST17. In step ST17, the CPU 1 judges whether or not a printer stop information has been received before the completion of the training of the communication procedure. If the CPU 1 has not received the printer stop information, the CPU 1 supplies a training failure signal (FTT) to the caller to cause the caller to hold on the sending of the video data in step ST 18.

In step ST12, if the printer 17 is not under operation, processing proceeds from the step ST16 to step ST19 or in the step ST17, if the CPU 1 receives the printer stop information from the printer 17, processing moves from the steps ST17 to ST19 or alternatively, if a printer stop information is received from the printer 17, processing proceeds from the step ST17 to step ST19 where the CPU 1 causes the modem 5 to send a reception preparing confirmation signal in step ST19 to start the reception of video data in step ST20.

As mentioned above, if there is a facsimile call during the operation of the printer 17, the reception of video data an be started as soon as the printer completes the printing operation by connection with the telephone line immediately because the pre-procedure of the facsimile apparatus is done in advance. Moreover, if the printer operation does not stop when the pre-procedure of the facsimile communication is completed, the CPU 1 sends the training failure signal to the facsimile caller to repeat the pre-procedure of the facsimile communication to cause the facsimile caller to await the start of the transmission of the video data, so that it is prevented that the data which had been received is mixed with the newly incoming data. Here, the training is carried out as follows:

On the transmitting side, before sending of the video data, data "0" is repeatedly transmitted at a predetermined rate, for example, 9600 bps. Due to noise in the telephone line, a bit may be inverted. The receiving side judges whether or not the communication is possible by detecting the received data "0".

In the above-mentioned embodiments, in the case that coding/decoding of data previously stored is carried out during reading is effected, a first processing speed at which the coding of the read data is smaller than a second processing speed of the scanner portion. That is, it is detected whether the buffer for storing the data previously stored is a full state. If the buffer for storing the data previously stored is full, the read data is once stored in the printer buffer 19. After this, the read data stored in the printer buffer 19 is coded. Further, in the case that during MMR-coding the MR-coded data, the read data is coded when there is an interruption of the MMR-coding. The interruption is detected by a full of buffer for the MMR-coding. Moreover, the end of a page is detected by the MPS signal or the end of message signal as well known.

What is claimed is:

1. A facsimile apparatus for sending and receiving an image as data through a communication line comprising:
    (a) a receiving buffer for sequentially storing received data;

(b) reading means for reading said image on a copy to be sent to produce read data;

(c) coding/decoding means for alternatively effecting either of coding said read data or decoding said received data;

(d) a printer buffer for storing said received data from said coding/decoding means in pages;

(e) a printer for printing out, in pages, said received data stored in said printer buffer after said decoding to reproduce said received image;

(f) a video memory for sequentially storing said read data coded by said coding/decoding means;

(g) first detection means for detecting whether or not a predetermined amount of said received data is stored in said receiving buffer;

(h) first control means, when there is a call from said communication line while said coding/decoding means codes said read data for keeping said coding/decoding means coding said read data if said predetermined amount of said received data is not stored in said receiving buffer and for interrupting said coding of said read data by said coding/decoding means and causing said coding/decoding means to decode said received data from said receiving buffer if said predetermined amount of said received data is stored in said receiving buffer;

(i) second detection means for detecting that said receiving buffer stores one page of said received data; and (j) second control means for interrupting said coding of said read data by said coding/decoding means and causing said coding/decoding means to decode said received data from said receiving buffer if said second detection means detects that said receiving buffer stores one page of said received data.

2. A facsimile apparatus for sending and receiving an image as data through a communication line comprising:

(a) a receiving buffer for sequentially storing received data from said communication line;

(b) reading means for reading said image on a copy to be sent to produce read data;

(c) coding/decoding means for effecting either of a first, second, or third operation, said first operation coding said read data to produce first coded data, said second operation coding said first coded data to produce second coded data, said third operation decoding said received data;

(d) storing means for storing said first coded data;

(e) a printer buffer for storing said received data decoded by said coding/decoding means in pages;

(f) a printer for printing out, in pages, said received data stored in said printer buffer;

(g) detection means for detecting whether or not there is a space capable of storing a predetermined amount of said received data in said printer buffer;

(h) first control means response to a command signal for operating said reading means, coding/decoding means, and said storing means to read said image to produce read data, effects said first operation to coding said read data to produce said first coded data, and store said first coded data respectively and then operating said coding/decoding means to effect said second operation to send said second coded data to said communication line using said first coded data stored in said storing means;

(i) second control means responsive to a call from said communication line for operating said receiving buffer to store said received data; and (j) third control means responsive to said first and second control means for keeping said second control means sending said second coded data in the absence of said space in said printer buffer and for, in the presence of said space in said printer buffer, interrupting said second operation and operating said coding/decoding means, said printer buffer, and said printer to effect said third operation using said received data from said receiving buffer and to print out said received data respectively.

3. A facsimile apparatus for sending and receiving an image as data through a communication line comprising:

(a) a receiving buffer for sequentially storing received data;

(b) reading means for reading a copy to produce a read data;

(c) coding/decoding means for coding said read data from receiving buffer and decoding and effecting error-checking of said received data from said receiving buffer;

(d) a printer buffer for storing said received data from said coding/decoding means in pages;

(e) a printer for printing out, in pages, said received data stored in said printer buffer to reproduce said image received;

(f) a video memory for sequentially storing said read data coded by said coding/decoding means;

(g) detection means for detecting whether or not one page of said received data is stored in said receiving buffer; and (h) control means, when there is said call while said coding/decoding means codes said read data, for interrupting that said coding/decoding means codes said read data and causing said coding/decoding means to effect said error-checking of said received data from said receiving buffer.

4. A facsimile apparatus for sending and receiving an image as data through a communication line comprising:

(a) a receiving buffer for sequentially storing received data;

(b) reading means for reading said image on a copy to sent to produce read data;

(c) coding/decoding means for coding said read data and decoding and effecting error-checking of said received data from said receiving buffer;

(d) a printer buffer for storing said received data from said coding/decoding means in pages;

(e) a printer for printing out, in pages, said received data stored in said printer buffer;

(f) a video memory for sequentially storing said read data coded by said coding/decoding means;

(g) first detection means for detecting whether or not an amount of said read data coded by said coding/decoding means from a start of coding of said read data exceeds a predetermined amount;

(h) second detection mean for detecting whether or not an interval of coding said read data from said start of said coding exceeds a predetermined interval;

(i) third detection means for detecting a decoding demand; and (j) control means responsive to said first and said third detection means for operating said coding/decoding means to decode said received data in presence of said decoding demand when said amount of said read data exceeds said predetermined amount.

5. A facsimile apparatus for sending and receiving an image as data through a communication line comprising:

(a) reading means for reading said image on a copy to be sent to produce read data;

(b) coding/decoding means for effecting either of a first or second operation, said first operation coding said read data to produce first coded data, said second operation coding said first coded data to produce a second coded data;

(c) first storing means for storing said read data coded by said coding/decoding means;

(d) second storing means for storing said read data from said reading means;

(e) detection means for detecting an interruption of said second operation; and (f) control means for operating said coding/decoding means to effect said second operation and for, when said detection means detects said interruption of said second operation, operating said coding/decoding means to effects said first operation and storing said first coded data from said coding/decoding means in said first storing means.

6. A facsimile apparatus as claimed in claim 5, further comprising second detection means for detecting a space in said second storing means before said reading means start to read said image on said copy every page, said space being capable of storing a predetermined amount of said read data, and a second control means for storing said read data from said reading means in the presence of said space.

7. A facsimile apparatus for sending and receiving an image as data through a communication line comprising:

(a) reading means for reading an image on a copy to be sent to produce read data;

(b) coding/decoding means for effecting either of a first or second operation, said first operation coding said read data to produce first coded data, said second operation coding said first coded data to produce a second coded data;

(c) storing means for storing said first coded data;

(d) a printer buffer for storing said read data from said reading means;

(e) detection means for detecting an interruption of said second operation;

(f) first control means for effecting said first operation and operating said storing means to store said first coded data; and (g) second control means responsive to said first control means for operating said coding/decoding means to effect said second operation using said first coded data from said storing means and operating said reading means and said printer buffer to read said copy and store said read data respectively and for, when said detection means detects said interruption of said second operation, operating said coding/decoding means to effects said first operation and storing said first coded data from said coding/decoding means in said storing means.

8. A facsimile apparatus for sending and receiving an image as data through a communication line comprising:

(a) reading means for reading said image on a copy to be sent to produce a read data;

(b) coding means for coding said read data;

(c) storing means for storing said coded data;

(d) a printer buffer for storing input data;

(e) a printer for printing out said image received using an output of said printer buffer;

(f) detection means for detecting whether or not a first processing speed at which said coding means codes said read data is less than a second processing speed at which said reading means read said copy; and (g) control means for operating said reading means, coding means, and storing means to read said copy, code said read data, and store read data coded by said coding means respectively when said first processing speed is not less than a second processing speed and for operating said reading means, said printer buffer, said coding means, and said storing means to read said copy, store said read data, code said read data from printer buffer, and store said read data from said coding means respectively when said first processing speed is less than a second processing speed.

9. A facsimile apparatus for sending and receiving an image as data through a communication line comprising:

(a) interface means responsive to a call for communicating with said communication line;

(b) a receiving buffer for sequentially storing received data from said communication line;

(c) coding/decoding means for decoding and effecting error-checking of said received data from said receiving buffer;

(d) a printer for printing out, in pages, said received data;

(e) a video memory for sequentially storing said received data;

(f) detection means responsive to said interface means for detecting an end signal indicative of an end of page of said received data; and (g) control means: for effecting first and second functions, said first function for operating said video memory, said coding/decoding means, and said printer to print out said received data stored in said video memory after decoding said received data by said coding/decoding means, said received data being received in response to previous said call;

said second function responsive to said first function for immediately connecting said interface means with said communication line and operating said receiving buffer in response to present said call and for, when said detection means detects said end signal, interrupting said printer and operating said coding/decoding means to effect error-checking of said received data received in response to present said call with repeatedly sent said end signals neglected and sending a response signal to said communication line and restarting said printer in response to a result of said error-checking.

10. A facsimile apparatus for sending and receiving an image as data through a communication line comprising:

(a) interface means responsive to a call for communicating with said communication line;

(b) a receiving buffer for sequentially storing received data from said communication line;

(c) coding/decoding means for decoding and effecting error-checking of said received data from said receiving buffer;

(d) a printer for printing out said received data in pages, said printer stopping of printing out of said received data at an end of page in response to a stop command;

(e) a video memory for sequentially storing said received data; and (f) control means: for effecting first function, second, and third functions, said first function for operating said video memory, said coding/decoding means, and said printer to print out said received data stored in said video memory after decoding said received data by said coding/decoding means, said received data being received in response to previous said call;

said second function responsive to said first function for immediately connecting said interface means with said communication line, sending said stop command to said printer, and effecting training with a calling party in response to present said call;

said third function responsive to said second function for detecting completion of said training and operating said receiving buffer and said coding/decoding means to receive currently incoming data and effect said error-checking of said receive currently incoming data.

11. A facsimile apparatus as claimed in claim 10, wherein said printer sends a stop response signal to said control means when said printer stops said printing out of said received data at an end of page in response to a stop command and said control means sending a training failure signal to said calling party when said control means does not receive said stop response signal until said control means detects said completion of said training.

12. A facsimile apparatus for sending and receiving an image as data through a communication line comprising:

(a) a receiving buffer for sequentially storing received data;

(b) reading means for reading said image on a copy to sent to produce read data;

(c) coding/decoding means for coding said read data and decoding and effecting error-checking of said received data from said receiving buffer;

(d) a printer buffer for storing said received data from said coding/decoding means in pages;

(e) a printer for printing out, in pages, said received data stored in said printer buffer;

(f) a video memory for sequentially storing said read data coded by said coding/decoding means;

(g) first detection means for detecting whether or not an amount of said read data coded by said coding/decoding means from a start of coding of said read data exceeds a predetermined amount;

(h) second detection mean for detecting whether or not an interval of coding said read data from said start of said coding exceeds a predetermined interval;

(i) third detection means for detecting a decoding demand; and (j) control means responsive to said second and third detection means for operating said coding/decoding means to decode said received data in presence of said decoding demand when said interval exceeds said predetermined interval.

13. A facsimile apparatus for sending and receiving an image as data through a communication line comprising:

(a) a receiving buffer for sequentially storing received data;

(b) reading means for reading said image on a copy to be sent to produce read data;

(c) coding/decoding means for alteratively effecting either of coding said read data or decoding said received data from said receiving buffer;

(d) a printer buffer for storing said received data from said coding/decoding means in pages;

(e) a printer for printing out, in pages, said received data stored in said printer buffer;

(f) a video memory for sequentially storing said read data coded by said coding/decoding means;

(g) first detection means for detecting whether or not a predetermined amount of said read data coded by said coding/decoding means from a start of coding of said read data exceeds a predetermined amount;

(h) second detection means for detecting a decoding demand; and (i) control means responsive to said first and second detection means for operating said coding/decoding means to decode said received data in the presence of said decoding demand when said amount of said read data exceeds said predetermined amount.

14. A facsimile apparatus for sending and receiving an image as data through a communication line comprising:

(a) a receiving buffer for sequentially storing received data;

(b) reading means for reading said image on a copy to be sent to produce read data;

(c) coding/decoding means for coding said read data and decoding and effecting error-checking of said received data from said receiving buffer;

(d) a printer buffer for storing said received data from said coding/decoding means in pages;

(e) a printer for printing out, in pages, said received data stored in said printer buffer;

(f) a video memory for sequentially storing said read data coded by said coding/decoding means;

(g) first detection means for detecting whether or not an interval of coding said read data from said start of coding exceeds a predetermined interval;

(h) second detection means for detecting a decoding demand; and (i) control means responsive to said first and second detection means for operating said coding/decoding means to decode said received data in presence of said decoding demand when said interval exceeds said predetermined interval.

15. A facsimile apparatus for sending and receiving an image as data through a communication line comprising:

(a) interface means responsive to a call for communicating with said communication line;

(b) a receiving buffer for sequentially storing received data from said communication line;

(c) coding/decoding means for decoding and effecting error-checking of said received data from said receiving buffer;

(d) a printer buffer for storing said received data from said coding/decoding means in pages;

(e) a printer for printing out, in pages, said received data stored in said printer buffer;

(f) detection means responsive to said interface means for detecting an end signal indicative of an end of page of said received data; and (g) control means for effecting first and second functions;

wherein said first function is for operating said coding/decoding means, said printer buffer, and said printer to print out said received data stored in said printer buffer after decoding said received data by said coding/ decoding means, said received data being received in response to previous said call; and wherein said second function, when there is a call while said received data stored in said printer buffer is printed out, is for immediately connecting said interface means with said communication line and operating said receiving buffer in response to present said call and for, when said detection means detects said end signal, interrupting said printer and operating said coding/ decoding means to effect error-checking of said received data received in response to present said call with repeatedly sent said end signals neglected and sending a response signal to said communication line and restarting said printer in response to a result of said error-checking.

16. A facsimile apparatus for sending and receiving an image as data through a communication line comprising:

(a) interface means responsive to a call for communicating with said communication line;

(b) a receiving buffer for sequentially storing received data from said communication line;

(c) coding/decoding means for decoding and effecting error-checking of said received data from said receiving buffer;

(d) a printer buffer for storing said received data from said coding/decoding means in pages;

(e) a printer for printing out, in pages, said received data stored in said printer buffer;

(f) a video memory for sequentially storing said received data; and (g) first control means: for effecting a first function, a second function, and a third function;

wherein said first function is for operating said printer buffer and said printer to print out said received data stored in said printer buffer after decoding said received data by said coding/decoding means, said received data being received in response to previous said call;

wherein said second function, when there is a call while said received data stored in said printer buffer is printed out, is for immediately connecting said interface means with said communication line, sending said stop command to said printer, and effecting training with a calling party in response to present said call; and wherein said third function is for detecting completion of said training, when a completion of said training is detected, and for operating said receiving buffer and said coding/decoding means to received currently incoming data and effect said error-checking of said received currently incoming data.

* * * * *